US010674229B2

United States Patent
Krauss et al.

(10) Patent No.: US 10,674,229 B2
(45) Date of Patent: Jun. 2, 2020

(54) ENABLING PERSONALIZED AUDIO IN ADAPTIVE STREAMING

(71) Applicants: DOLBY LABORATORIES LICENSING CORPORATION, San Francisco, CA (US); DOLBY INTERNATIONAL AB, Amsterdam Zuidoost (NL)

(72) Inventors: Kurt Krauss, Nuremberg (DE); Michael Peter Assenti, San Francisco, CA (US)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 118 days.

(21) Appl. No.: 16/074,549

(22) PCT Filed: Jan. 31, 2017

(86) PCT No.: PCT/US2017/015864
§ 371 (c)(1),
(2) Date: Aug. 1, 2018

(87) PCT Pub. No.: WO2017/136354
PCT Pub. Date: Aug. 10, 2017

(65) Prior Publication Data
US 2019/0037283 A1 Jan. 31, 2019

Related U.S. Application Data

(60) Provisional application No. 62/342,315, filed on May 27, 2016, provisional application No. 62/314,610, (Continued)

(51) Int. Cl.
*G06F 17/30* (2006.01)
*H04N 21/81* (2011.01)
(Continued)

(52) U.S. Cl.
CPC ....... *H04N 21/8106* (2013.01); *G06F 16/635* (2019.01); *G06F 16/68* (2019.01); *H04N 21/26258* (2013.01); *H04N 21/8586* (2013.01)

(58) Field of Classification Search
CPC combination set(s) only.
See application file for complete search history.

(56) References Cited

U.S. PATENT DOCUMENTS

| 2014/0310779 | A1* | 10/2014 | Lof | H04L 63/0421 |
| | | | | 726/4 |
| 2016/0154861 | A1* | 6/2016 | Hegerty | G06F 16/9535 |
| | | | | 707/728 |
| 2016/0357376 | A1* | 12/2016 | Carrigan | G06F 3/0482 |

OTHER PUBLICATIONS

Pantos, R. et al "HTTP Live Streaming: Draft-Pantos-http-live Streaming-18.txt", Internet Engineering Task Force Internet Society, Rue de Falaise, Geneva Switzerland, Nov. 19, 2015, pp. 1-49.
(Continued)

*Primary Examiner* — Amir H Etesam

(57) ABSTRACT

Personalized audio metadata is generated based on audio program elements and presentation configuration metadata to specify personalized audio presentations for a media presentation. The personalized audio metadata is transmitted to an adaptive streaming client in response to receiving a media presentation request by the adaptive streaming client for the media presentation. Audio program elements of a specific personalized audio presentation are transmitted to the adaptive streaming client in response to receiving subsequent media streaming requests for the audio program elements.

24 Claims, 8 Drawing Sheets

Related U.S. Application Data filed on Mar. 29, 2016, provisional application No. 62/289,765, filed on Feb. 1, 2016.

(51) Int. Cl.
*H04N 21/262* (2011.01)
*H04N 21/858* (2011.01)
*G06F 16/68* (2019.01)
*G06F 16/635* (2019.01)

(56) References Cited

OTHER PUBLICATIONS

Tokumo, Y. et al "DASH: Additional Descriptor for Combination of Representations", MPEG Meeting Jul. 18-22, 2011, Torino, pp. 1-6.
Riedmiller, J. et al "Immersive & Personalized Audio: A Practical System for Enabling Interchange, Distribution & Delivery of Next Generation Audio Experiences", SMPTE Motion Imaging Journal, vol. 124, Oct. 21, 2014, pp. 1-23.
Sodagar, Iraj "Exploration of Playing Multiple MPD's Using Playlist" ISO/IEC/JTC1/SC29/WG11, Oct. 2015, Geneva, Switzerland.

\* cited by examiner

```
#EXTM3U

#EXT-X-STREAM-INF:BANDWIDTH=7680000,CODECS="avc1.640028,ec-3.p,",\
AUDIO="Audio Program"
video-only.m3u8

#EXT-X-MEDIA:TYPE=AUDIO,GROUP-ID="Audio Program",\
NAME="Audio Presentation A",AUTOSELECT="YES",\
CHARACTERISTICS="com.dolby.audio-role.music-and-effects,com.dolby.audio-
role.dialog",\
URI="Audio-Program-Element-A.m3u8",URI=" Audio-Program-Element-B.m3u8"

#EXT-X-MEDIA:TYPE=AUDIO,GROUP-ID="Audio Program",\
NAME="Audio Presentation B",AUTOSELECT="YES",\
CHARACTERISTICS="com.dolby.audio-role.music-and-effects,com.dolby.audio-
role.dialog",\
URI="Audio-Program-Element-A.m3u8",URI=" Audio-Program-Element-C.m3u8"
```

FIG. 3A

```
#EXTM3U

#EXT-X-STREAM-INF:BANDWIDTH=1280000,CODECS="avc1.640028,ec-
3.p",AUDIO="personalized-audio-group"
low/video-only.m3u8
#EXT-X-STREAM-INF:BANDWIDTH=2560000,CODECS="avc1.640028,ec-
3.p",AUDIO="personalized-audio-group"
mid/video-only.m3u8
#EXT-X-STREAM-INF:BANDWIDTH=7680000,CODECS="avc1.640028,ec-
3.p",AUDIO="personalized-audio-group"
hi/video-only.m3u8

#EXT-X-MEDIA:TYPE=AUDIO,GROUP-ID="personalized-audio-group",\
NAME="Warriors Experience",AUTOSELECT="YES",\
CHARACTERISTICS="com.dolby.audio-role.music-and-effects, com.dolby.audio-role.dialog",\
LANGUAGE="en", URI="music-and-effects/ddplus.m3u8",URI="dialog/warriors-
ddplus.m3u8"

#EXT-X-MEDIA:TYPE=AUDIO,GROUP-ID="personalized-audio-group",\
NAME="Cavaliers Experience",AUTOSELECT="NO",\
CHARACTERISTICS="com.dolby.audio-role.music-and-effects, com.dolby.audio-role.dialog",
\
LANGUAGE="en", URI="music-and-effects/ddplus.m3u8",URI="dialog/cavs-ddplus.m3u8"

#EXT-X-MEDIA:TYPE=AUDIO,GROUP-ID="personalized-audio-group",\
NAME="Lengua Española",AUTOSELECT="YES",\
CHARACTERISTICS="com.dolby.audio-role.music-and-effects, com.dolby.audio-role.dialog",
LANGUAGE="es", URI="music-and-effects/ddplus.m3u8",URI="dialog/spanish-
ddplus.m3u8"

#EXT-X-MEDIA:TYPE=AUDIO,GROUP-ID="personalized-audio-group",\
NAME="On The Court",AUTOSELECT="NO",\
CHARACTERISTICS=" com.dolby.audio-role.music-and-effects", \
URI="music-and-effects/onthecourt.m3u8"

#EXT-X-MEDIA:TYPE=AUDIO,GROUP-ID="personalized-audio-group",\
NAME="Warriors Courtside",AUTOSELECT="NO",\
CHARACTERISTICS="com.dolby.audio-role.music-and-effects,com.dolby.audio-role.dialog",\
URI="music-and-effects/onthecourt.m3u8",URI="dialog/warriors-ddplus.m3u8"
```

FIG. 3B

| Role | Type | UTI | Comments |
|---|---|---|---|
| Complete Main | Main | com.dolby.audio-role.complete-main | A complete audio program which may be played back without associated audio program elements. |
| Music and Effects | Main | com.dolby.audio-role.music-and-effects | The music and effects, or 'ambience' of an audio program. |
| Visually Impaired | Assoc. | com.dolby.audio-role.visually-impaired | Associated audio descriptive element for the visually impaired. |
| Hearing Impaired | Assoc. | com.dolby.audio-role.hearing-impaired | Associated audio element for the hearing impaired |
| Dialog | Assoc. | com.dolby.audio-role.dialog | The dialog of an audio program. Typically combined with the music and effects to make up a complete program. |
| Commentary | Assoc. | com.dolby.audio-role.commentary | Associated commentary |
| Emergency | Assoc. | com.dolby.audio-role.emergency | Emergency channel audio |
| Voiceover | Assoc. | com.dolby.audio-role.voiceover | Associated voice over |
| Karaoke | Main | com.dolby.audio-role.karaoke | Karaoke |

FIG. 4

ENABLING PERSONALIZED AUDIO IN ADAPTIVE STREAMING

CROSS-REFERENCE TO RELATED APPLICATIONS

This application claims priority to U.S. Provisional Patent Application No. 62/342,315, filed on May 27, 2016, U.S. Provisional Patent Application No. 62/314,610, filed on Mar. 29, 2016 and U.S. Provisional Patent Application No. 62/289,765, filed on Feb. 1, 2016, each of which is incorporated herein by reference in its entirety.

TECHNOLOGY

The present invention relates generally to media content, and in particular, to enabling personalization in audio content.

BACKGROUND

Professional media programs such as movies and TV programs are often directed to large diverse user populations. A large diverse user population likely comprises users of different spoken languages, users of opposing sports teams, users of different regions, or users of different preferences. Therefore, monolithic audio content such as an English language version or a host team version may not allow all the users in the user population to fully enjoy a media program.

Multiple self-contained versions of audio content directed to multiple different segments of a user population may be created for a media program. For example, a self-contained Spanish language version of audio content may be created alongside a self-contained English language version of audio content. Each of the multiple self-contained versions of audio content may comprise a different complete representation of intended soundscapes for the media program, perhaps with a common audio bed or additional common audio content elements. The multiple self-contained versions containing the repetitive common audio bed or additional common audio content elements may be concurrently delivered over a high bandwidth transport such as high bandwidth broadcast networks to consumer devices. A user of a recipient consumer device may manually or by default select one of the multiple self-contained versions of audio content for the media program.

In many scenarios, however, media consuming devices may not have sufficient network bandwidths and resources as compared with client devices of high bandwidth broadcast networks. Over the internet, it may be highly inefficient and even impossible to realize for a media consuming client to receive multiple self-contained versions of audio content while only one self-contained versions is rendered at any given time by the client.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A and FIG. 3B illustrate two examples of using HLS-related syntax elements;

FIG. 4 illustrates a list of example UTIs for a plurality of audio program elements;

DESCRIPTION OF EXAMPLE EMBODIMENTS

Figure 1:
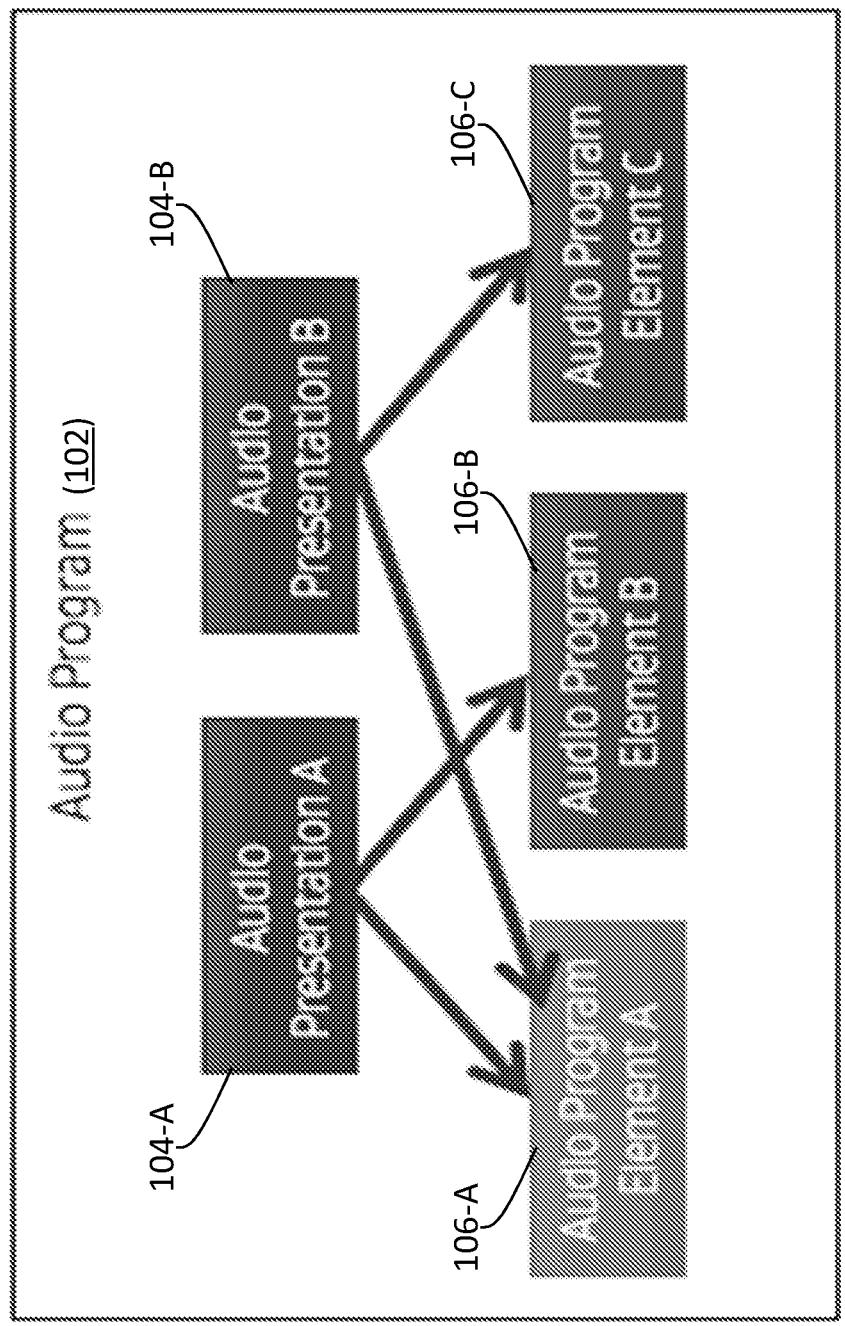
FIG. 1 illustrates an example personalized audio program.

Example embodiments, which relate to enabling personalization in audio content, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. GLOSSARY
3. PERSONALIZED AUDIO PRESENTATIONS AND AUDIO PROGRAM ELEMENTS
4. AUDIO DELIVERY OPTIONS
5. DELIVERING PERSONALIZED AUDIO PRESENTATIONS
6. EXAMPLE PERSONALIZED AUDIO PLAYLISTS
7. EXAMPLE DASH-RELATED SYNTAX ELEMENTS
8. CONTENT PREPARATION AND STREAMING
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Example embodiments described herein relate to streaming personalized audio content to adaptive streaming clients.

A plurality of audio program elements of a personalized audio program in a media presentation is received as first input. Presentation configuration metadata in connection with the personalized audio program in the media presentation is received as second input. Personalized audio metadata that specifies a plurality of personalized audio presentations for the personalized audio program in the media presentation is generated based at least in part on the plurality of audio program elements in the first input and the presentation configuration metadata in the second input. The personalized audio metadata that specifies the plurality of personalized audio presentations is caused to be transmitted to an adaptive streaming client in response to receiving a media presentation request by the adaptive streaming client for the media presentation. One or more audio program elements that make up a specific personalized audio presentation are caused to be transmitted to the adaptive streaming client in response to receiving one or more subsequent media streaming requests for the one or more audio program elements. The adaptive streaming client originates the one or more media streaming requests for the one or more audio program elements after the adaptive streaming client (a) receives the personalized audio metadata as requested with the media presentation request and (b) uses the personalized audio metadata to select the specific personalized audio presentation, from among the plurality of personalized audio presentations.

Example embodiments described herein relate to accessing media presentations with personalized audio content. A media presentation request for a media presentation that comprises a personalized audio program is sent to one or more media streaming servers over one or more networks. The personalized audio program comprises a plurality of audio program elements. Personalized audio metadata that specifies a plurality of personalized audio presentations for the personalized audio program in the media presentation is received from the one or more media streaming servers. The personalized audio metadata is used to select a specific personalized audio presentation in the plurality of personalized audio presentations as identified in the personalized audio metadata received from the one or more media streaming servers. The specific personalized audio presentation is made up of one or more audio program elements in the plurality of audio program elements of the personalized audio program in the media presentation. One or more subsequent media streaming requests for the one or more audio program elements that make up the specific personalized audio presentation are sent to the one or more media streaming servers. The one or more audio program elements that make up the specific personalized audio presentation are received from the one or more media streaming servers.

In some example embodiments, mechanisms as described herein form a part of a media processing system, including but not limited to any of: mobile device, VR system, AR system, head up display device, helmet mounted display device, CAVE-type system or wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, desktop computer, computer workstation, computer server, computer kiosk, or various other kinds of computing devices and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Glossary

For the purpose of illustration, example terms used in this description may include, but are not necessarily limited to only, any of the following:

Media presentation—This term describes the entirety of media content (including all video, audio and other associated content) of a media program, which is streamed to adaptive streaming clients via HTTP Live Streaming (HLS), Dynamic Adaptive Streaming over HTTP (DASH), etc.

Playlist—This is the entry point to a stream-based (e.g., HLS-based, DASH-based, etc.) media presentation, and contains all of the information needed by the adaptive streaming client (e.g., under HLS, DASH, etc.) to determine the most appropriate streams and the URLs to download the streams. A playlist may be a master playlist (or a personalized audio playlist) that contains references to variant streams, or a media playlist (referenced by the master playlist or the personalized audio playlist) that contains references to the actual stream segments.

Stream—This may refer to any single, contained component of a media presentation, for example, a video stream, an audio stream, or the like, that may be multiplexed within a transport stream container (e.g., a media data container, etc.).

Bitstream—This may refer to a complete elementary stream, which may be demultiplexed from a transport stream container (e.g., a media data container, etc.). A bitstream may be made of a single substream (or stream), or multiple substreams (or component streams).

Audio program—This refers to one of the integral parts of a media presentation, together with the video and other data. The audio program comprises one or multiple (e.g., audio) program elements. As used herein, the term "audio program" may refer to personalized audio program in which any of multiple personalized audio presentations supported by audio program elements in the audio program may be selected by an adaptive streaming client or a user thereof for rendering.

Audio program element—This refers to a component part of an audio program containing audio content and metadata. An audio program element can have a dedicated role. Examples of roles include, but are not necessarily limited to only, any of: Main, Dialog, Music and effects, Audio description/supplementary audio, etc. One or more audio program elements may be grouped into personalized audio presentations each of which can provide a specific audio experience. While multiple audio program elements as described herein may be multiplexed into either a single audio bitstream or separate audio bitstreams, some non-limiting example embodiments including related syntax and behavior are described for the purpose of illustration specifically for operational scenarios in which each audio program element may be accessed, switch to, downloaded, delivered, etc., as a separate bitstream.

Audio presentation (e.g., personalized audio presentation, etc.)—This refers to an inventory that describes a specific (e.g., closed) set of one or more audio program elements to be decoded and presented simultaneously. The ability to deliver multiple audio program elements and combine these multiple audio program elements into personalized audio presentations is a key building block for delivering personalized audio content experiences. Personalized audio presentations supported under techniques as described herein allow flexibility in creating a wider range of different specific audio content experiences.

Packager (e.g., personalized audio packager, HLS packager, DASH packager, etc.)—This refers to the unit in a media processing pipeline (e.g., a live streaming session, a live workflow, etc.) that takes encoded video and audio of a media presentation (or media program) as input, and delivers a packaged media presentation (e.g., HLS presentation, DASH media presentation, etc.) as output, including but not limited to authoring a personalized audio playlist.

Client (e.g., adaptive streaming client under HLS, DASH, etc.)—This may refer to a computing device, a streaming client, a component in a computing device (e.g., consumer device, media playback system/device, etc.), etc., responsible for parsing personalized audio playlists (e.g., HLS playlists, DASH Media Programming Description and other related metadata, etc.), presenting any options up to an application layer (e.g., at which a media playing application operates, etc.), and controlling and managing the synchronized progressive download of all streams to be passed to demultiplexing/decoding/decompression components.

DAA—This refers to Dolby Audio for Mobile Applications, which may comprise media applications or media application elements implementing personalized audio techniques as described herein, some or all of which may be incorporated into one or more media applications running on a computing device such as a mobile device, etc.

Bundle (or audio bundle)—This is a term analogous to the above-mentioned term "audio program." This refers to a closed set of audio program elements (or audio elements) that can contribute to the playout of an audio decoder implementing techniques as described herein. Examples for audio program elements are an English dialogue, German dialogue, Music & Effects, etc. Audio program elements as described herein can be carried in one or separate streams. Not necessarily all audio program elements of one bundle are played out at the same time. The set of audio program elements of one audio bundle can provide multiple personalization options like different languages, flexible gain or spatial location of audio elements, typically exposed through a user interface to a user of an adaptive streaming client (e.g., a consumer device, a streaming client, a mobile device, etc.). A bundle can contain several preselections.

Preselection—This is a term analogous to the above-mentioned term "audio presentation." A Preselection is a personalization option that is associated with one or more audio program elements from one bundle plus additional parameters like gain, spatial location to produce a complete audio experience. A preselection can contain a complete audio mix for audio codecs to render. The concept of preselections is orthogonal to the concept of Adaptation Sets in DASH. Multiple preselections (or instances thereof) can refer to the same audio program elements (or streams) in a bundle for example with different settings for gain and spatial location. Only audio program elements of the same bundle can contribute to the decoding and rendering of a preselection. The preselection concept represents not only a streaming-related concept but also a codec-related concept that may be mapped into or supported by the systems layer of codecs implementing techniques as described herein to provide a basic selection mechanism (e.g., for preselection choices, for user preferred languages, accessibility, etc.). Using a preselection as a starting point (or entry point), an adaptive streaming client can avoid unnecessary consumption of network resources by downloading only those Adaptation Sets that are part of the chosen Preselection.

Compound stream—This refers to an audio elementary stream that comprises more than one audio program element.

Full-Compound Stream—This refers to an audio elementary stream that comprises all audio program elements belonging to one audio bundle.

3. Personalized Audio Presentations and Audio Program Elements

FIG. 1 illustrates personalized audio presentations (or preselections) and audio program elements (or audio elements) that together make up a single personalized audio program (or an audio bundle) of media presentation. As shown in FIG. 1, an example (e.g., personalized) audio program 102 may comprise a plurality of audio program elements 106-A through 106-C. Examples of audio program elements may include, but are not necessarily limited to only, any of base The plurality of audio program elements (106-A through 106-C) may be used to generate/create a plurality of personalized audio presentations 104-A and 104-B. For example, the audio program elements (106-A and 106-B) may be used to generate/create the personalized audio presentation (104-A), whereas the audio program elements (106-A and 106-C) may be used to generate/create the personalized audio presentation (104-B).

In some embodiments, personalized audio (or personalization options) as described herein may be based at least in part on separating a personalized audio presentation into audio program elements (e.g., base components, interchangeable components, etc.). A media production system (e.g., media encoding system, media streaming server, media broadcasting system, production studio system, an audio mix creation system, etc.) may create the audio program elements, and may define/specify a plurality of personalized audio presentations (e.g., 104-A and 104-B, etc.). Each personalized audio presentation may correspond to, or may represent, a respective audio mix in a plurality of (e.g., pre-defined, self-complete) audio mixes. The plurality of personalized audio presentations (e.g., 104-A and 104-B, etc.) may correspond to a plurality of different combinations of audio program elements. An adaptive streaming client, or a user that operates/uses the adaptive streaming client, may select a specific personalized audio presentation as a part of a media presentation.

As an example, consider a basketball game between the Golden State Warriors and the Cleveland Cavaliers. As part of a media presentation or production ("Warriors vs Cavaliers") of this game, one or more audio mixers (e.g., audio mixing systems operated by audio professionals, etc.) may be used to prepare the following audio program elements: (1) Clean Music and Effects (5.1)—the standard mix of the stadium ambience in 5.1 channels; (2) Courtside Music and Effects (5.1)—a more visceral, closer mix of the stadium ambience in 5.1 channels; (3) Warriors Announcers (1.0)—a mono feed of the dialog for the Warriors specific commentary; (4) Cavaliers Announcers (1.0)—a mono feed of the dialog for the Cavaliers specific commentary; and (5) Spanish Language Announcers (1.0)—a mono feed of the dialog for the Spanish language commentary.

A media system (e.g., a media broadcasting system, etc.) operating in conjunction with the audio mixers may define/specify a plurality of personalized audio presentations (e.g., audio preselections, audio presets, etc.) such as a first personalized audio presentation "Warriors Experience," a second personalized audio presentation "Cavaliers Experience," a third personalized audio presentation "Lengua Española," a fourth personalized audio presentation "On The Court," a fifth personalized audio presentation "Warriors Courtside," etc. Each of these personalized audio presentations may correspond to, or may represent, a respective personalized audio mix in a plurality of (e.g., pre-defined, self-complete) personalized audio mixes.

In the present example, the first personalized audio presentation named "Warriors Experience" may comprise (1) Clean Music and Effects and (3) Warriors Announcer. The second personalized audio presentation named "Cavaliers Experience" may comprise (1) Clean Music and Effects and (4) Cavaliers Announcer. The third personalized audio presentation named "Lengua Española" may comprise (1) Clean Music and Effects and (5) Spanish Language Announcer. The fourth personalized audio presentation named "On The Court" may comprise (2) Courtside Music and Effects. The fifth personalized audio presentation named "Warriors Courtside" may comprise (2) Courtside Music and Effects and (3) Warriors Announcer.

A media presentation or production as described herein may refer to a media program that can be audio only, audiovisual, etc. Examples of media presentations (or media productions) may include, but are not necessarily limited to only, movies, TV programs, sports events (e.g., "Warriors vs Cavaliers," etc.), musical plays, concerts, etc. An audio only media presentation comprises a (e.g., personalized) audio program and metadata that may be associated with the audio program. An audiovisual media presentation comprises a video program, a (e.g., personalized) audio program that corresponds to the video program, and metadata that may be associated with either or both of the video program and the audio program.

A (e.g., personalized) audio program and a video program of a media presentation may capture audio content and image content of scenes (or timewise segments of the media presentation) that are represented in the media presentation. In other words, a scene represented in the media presentation may be depicted with an audio content portion in the audio content captured by the audio program and a corresponding image content portion in the image content captured by the video program.

4. Audio Delivery Options

Techniques as described herein can be used to enable relatively high flexibility for content creation as compared to other approaches that do not implement these techniques. The high flexibility benefits operators (e.g., content providers, media broadcasters, media streamers, etc.) in content creation, adaptive streaming, hybrid delivery, broadcast and OTT delivery when providing personalized and immersive audio services.

In some embodiments, a single stream is used to enable one single experience. This flavor of content creation is identical to the form of content creation supported by some codecs. This type of content contains all audio in a single stream that conveys one experience. Usually the amount of personalization enabled by this format is very limited for broadcast use. When using this form of content creation, a broadcaster providing its program in, for example, different languages would create individual streams each of which contains all audio for one dedicated experience. TABLE 1 below illustrates four example individual audio streams "Main English," "Main Spanish," "Main English+Descriptive Video Service (DVS)," and "Main Spanish+DVS," each of which individual audio streams comprises all audio for a corresponding preselection (e.g., preselection 1 for "Main English," etc.).

TABLE 1

| Individual Audio Streams | Main English | Main Spanish | Main English + DVS | Main Spanish + DVS |
|---|---|---|---|---|
| Preselection 1 | X | | | |
| Preselection 2 | | X | | |
| Preselection 3 | | | X | |
| Preselection 4 | | | | X |

In some embodiments, a single stream is used to enable multiple experiences. This form of content creation allows embedding of audio for more than one personalization option into one audio elementary stream. This is usually done by encoding audio program elements like Music and Effects, Dialogues and potentially other audio individually but multiplexed together to one audio elementary stream. This form of content creation enables efficient content delivery over broadcast, where all audio program elements are consistently made available to a large community of viewers. Multiplexing overheads for individual packaging in transport formats can be minimized. Aggregation of personalize-able audio within one elementary stream makes the handling of audio streams and switching between experiences relatively simple in broadcast. This approach may not be appropriate for delivery over over-the-top (OTT) networks (e.g., over the Internet, etc.) as the single bitstream with all the audio program elements involves downloading audio program elements which are not consumed by the broadcast receiver or a user thereof. TABLE 2 below illustrates a single audio stream, "Stream 1," which comprises all audio program elements of an audio program (or an audio bundle) of a media presentation. These audio program elements in the single stream may be used to support multiple preselections 1 through 4.

TABLE 2

| Full-compound stream | Music & Effects | English Dialogue | Spanish Dialogue | English DVS | Spanish DVS |
|---|---|---|---|---|---|
| File Mux | Stream 1 | | | | |
| Preselection 1 | X | X | | | |
| Preselection 2 | X | X | | X | |
| Preselection 3 | X | | X | | |
| Preselection 4 | X | | X | | X |

In some embodiments, multiple streams may be used to enable multiple experiences. This form of content creation works similar to the content creation described in the previous case. A difference is that the individual audio program elements are not multiplexed together into one elementary stream, but are either all made available as individual elementary streams, or grouped in a reasonable manner into more than one elementary stream. This form of content creation enables efficient delivery of audio over broadcast and broadband simultaneously for realization of hybrid use cases. TABLE 3 below illustrates five example individual audio streams, "Stream 1" through "Stream 5," each of which carries all audio for a corresponding audio program elements, namely "Music & Effects," "English Dialogue," "Spanish Dialogue," "English DVS," and "Spanish DVS,". A personalized audio presentation, such as one of "Preselection 1" through "Preselection 4," may be enabled by downloading one, two or more audio program elements in that personalized audio presentation using one, two or more audio streams that correspond to the one, two or more audio program elements. For example, to enable "Preselection 1" for an adaptive streaming client or a user thereof, audio program elements "Music & Effects" and "English Dialogue" may be downloaded using the corresponding streams "Stream 1" and "Stream 2," without downloading other audio program elements (e.g., "Spanish Dialogue," "English DVS," "Spanish DVS," etc.) that are not in "Preselection 1 ."

TABLE 3

| Audio elements in individual audio streams | Music & Effects | English Dialogue | Spanish Dialogue | English DVS | Spanish DVS |
|---|---|---|---|---|---|
| File Mux | Stream 1 | Stream 2 | Stream 3 | Stream 4 | Stream 5 |
| Preselection 1 | X | X | | | |
| Preselection 2 | X | X | | X | |
| Preselection 3 | X | | X | | |
| Preselection 4 | X | | X | | X |

5. Delivering Personalized Audio Presentations

Figure 2:
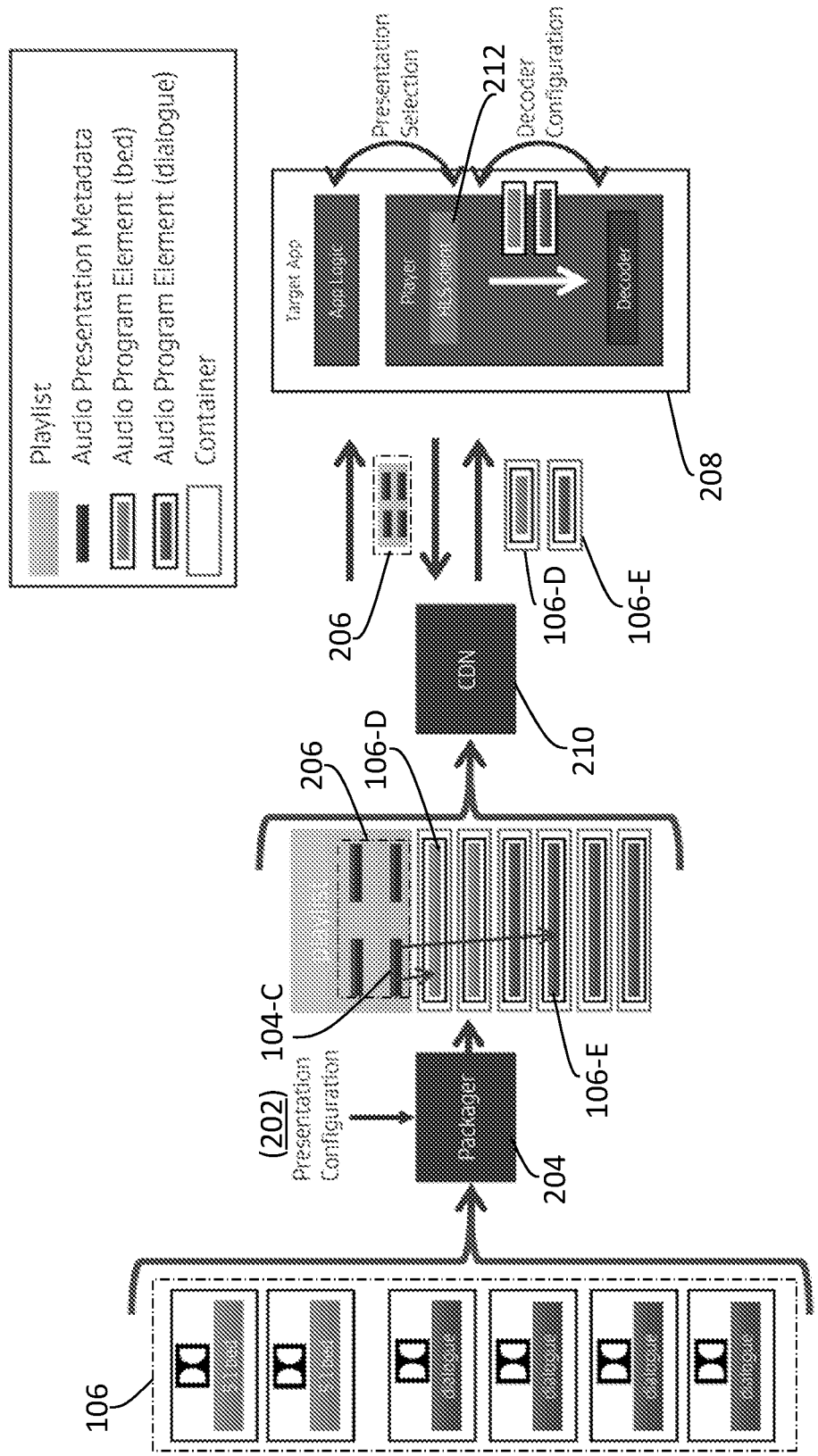
FIG. 2 illustrates an example processing pipeline to prepare and deliver audio content of multiple personalized audio presentations to adaptive streaming clients using bandwidth-efficient and bandwidth-adaptive media streaming.

FIG. 2 illustrates an example processing pipeline to prepare and deliver audio content of multiple personalized audio presentations to adaptive streaming clients using bandwidth-efficient and bandwidth-adaptive media streaming. Under techniques as described herein, a media system may be configured to generate presentation configuration metadata 202 specific for a plurality of (e.g., all) individual audio program elements 106 that make up a personalized audio program (e.g., 102) in a media presentation. In some embodiments, some or all of the presentation configuration metadata (202) is generated based at least in part on user input from an audio mixing professionals, a media production user, etc., for example as a part of media streaming content production or preparation operations.

The presentation configuration metadata (202) and the audio program elements (106) may be received/used by a personalized audio packager 204 as input. A personalized audio packager as described herein may be implemented in software, hardware, a combination of software and hardware, etc., as a part of the media system or as a separate system/device operating in conjunction with the media system. Examples of personalized audio packagers may include, but are not necessarily limited to only, any of: HLS packagers, DASH packagers, etc.

In an example, based on the presentation configuration metadata (202) and the audio program elements (106), the personalized audio packager (204) constructs/generates a personalized audio playlist 206 that comprises personalized audio metadata specifying/defining a plurality of (e.g., all user-selectable, all pre-specified, all predefined, etc.) personalized audio presentations of the personalized audio program (102) in the media presentation.

In another example, based on the presentation configuration metadata (202) and the audio program elements (106), the personalized audio packager (204) constructs/generates a media presentation description (MPD) that comprises personalized audio metadata specifying/defining a plurality of (e.g., all user-selectable, all pre-specified, all predefined, etc.) personalized audio presentations of the personalized audio program (102) in the media presentation.

In some embodiments, each personalized audio presentation (e.g., 104-A, 104-B, 104-C, etc.) in the plurality of personalized audio presentations (e.g., 104-A and 104-B of FIG. 1, 104-C of FIG. 2, etc.) as specified/defined by the personalized audio metadata (e.g., the personalized audio playlist (206), the MPD, etc.) corresponds to or represents a specific audio mix in a plurality of pre-specified or pre-defined audio mixes. A personalized audio presentation (e.g., 104-A or 104-B of FIG. 1, 104-C of FIG. 2, etc.) may comprise all audio program elements of the personalized audio program (102), or a proper subset of a set comprising all audio program elements of the personalized audio program (102). For example, a personalized audio presentation 104-C in the plurality of audio presentations (e.g., 104-A and 104-B of FIG. 1, 104-C of FIG. 2, etc.) as specified/defined by the personalized audio metadata (e.g., the personalized audio playlist (206), the MPD, etc.) may comprise audio program elements 106-D and 106-E, which constitute a proper subset of all audio program elements (106) of the personalized audio program (102) in the media presentation. In some embodiments, the audio program element (106-D) may represent a base component of a corresponding audio mix such as an audio bed of the audio mix, whereas the audio program element (106-E) may represent a non-base component of the same audio mix such as an audio dialogue program element of the audio mix.

Client devices (or adaptive streaming clients) may access/retrieve/receive/download the personalized audio metadata (e.g., the personalized audio playlist (206), the MPD, etc.) as a part of accessing the media presentation for which the personalized audio metadata defines (e.g., user-selectable, client-selectable, etc.) personalized audio presentations for the personalized audio program (102) of the media presentation. For example, the personalized audio metadata (e.g., the personalized audio playlist (206), the MPD, etc.) may be stored as a part of personalized audio metadata such as a playlist, a media presentation description, a media streaming index file, an XML file, a text file, etc., that is associated with the media presentation for which the personalized audio metadata defines (e.g., user-selectable, client-selectable, etc.) personalized audio presentations for the personalized audio program (102) in the media presentation.

An adaptive streaming client (e.g., under HLS, DASH, etc.) that accesses the personalized audio metadata (e.g., the personalized audio playlist (206), the MPD, etc.) parses the personalized audio metadata; determines, based on the personalized audio metadata, all possible personalized audio presentations for the personalized audio program (102) in the media presentation; determines, based on the personalized audio metadata, audio program elements in each personalized audio presentation that are required to be downloaded and passed to one or more audio decoders of the adaptive streaming client. The adaptive streaming client may present some or all personalized audio presentations identified in the personalized audio metadata (e.g., the personalized audio playlist (206), the MPD, etc.) to a user of the adaptive streaming client. The adaptive streaming client may make a selection of a specific personalized audio presentation in response to receiving user input specifying the selection. Additionally, optionally, or alternatively, the adaptive streaming client may automatically select a specific personalized audio presentation, for example, based on a location property (e.g., in Oakland, in a Warrior territory, etc.) of the adaptive streaming client.

When a specific personalized audio presentation (e.g., 104-C) is selected, by an adaptive streaming client or by a user of the adaptive streaming client, from among the plurality of personalized audio presentations (e.g., 104-A and 104-B of FIG. 1, 104-C of FIG. 2, etc.), only all audio program elements (e.g., represented by the audio program elements 106-D and 106-E, etc.) represented in the specific personalized audio presentation (104-C)—but audio elements of the personalized audio program (102) that are not in the selected specific personalized audio presentation (104-C) need not be played/rendered or even accessed by the adaptive streaming client which selects the specified personalized audio presentation for the media presentation—are downloaded, passed to the one or more decoders of the adaptive streaming client, and rendered into a specific audio mix corresponding to the selected specific personalized audio presentation.

Techniques as described herein support transferring and signaling media presentation data, audio program elements, video program, etc., generated/constructed by a wide variety of media systems to downstream client devices (or adaptive streaming clients) based on syntax (e.g., data coding syntax, etc.), data containers, behavior, etc., as defined/specified in any of a variety of media streaming protocols, standards, proprietary enhancements of standards, etc. In an example, HLS related standards or proprietary extensions thereof may be used to provide a coding syntax comprising a plurality of syntax elements specifying operations and parameters related to signaling personalized audio metadata, encoding and decoding of media data represented in audio program elements, video programs, etc., in media presentations. In another example, DASH related standards or proprietary extensions thereof may be used to provide a coding syntax comprising a plurality of syntax elements specifying operations and parameters related to signaling personalized audio metadata, encoding and decoding of media data represented in audio program elements, video programs, etc., in media presentations. In yet another example, non-DASH non-HLS standards or proprietary extensions thereof may be used to provide a coding syntax comprising a plurality of syntax elements specifying operations and parameters related to signaling personalized audio metadata, encoding and decoding of media data represented in audio program elements, video programs, etc., in media presentations.

Syntax elements of a coding syntax as described herein are capable of describing operations, parameters, etc., that are common to some or all of the different media streaming specifications or that are specific to only one or more but not all of the different media streaming specifications.

A decoding/parsing process may be implemented, for example, in a downstream adaptive streaming client (e.g., consumer device, etc.), to decode a coding syntax, or syntax elements therein, in compliance with one or more media streaming specifications of HLS related standards or proprietary extensions thereof, DASH related standards or proprietary extensions thereof, non-DASH non-HLS standards or proprietary extensions thereof, etc. A downstream adaptive streaming client may, but is not required to, implement an individual and distinct decoding/parsing process for every existing or new media streaming specification. A provider (e.g., developer, vendor, manufacturer, etc.) of downstream adaptive streaming clients may focus on providing support for algorithms, operations, syntaxes, syntax elements, parameters, etc., for one or more supported media streaming specifications. An adaptive streaming client as described herein may be configured to support any in one or more of: a portion of a media streaming standard, a media streaming standard in full, multiple streaming standards, etc.

6. Example Personalized Audio Playlists

In a non-limiting implementation example, an HLS Syntax—as defined by HLS-related standards or proprietary extension thereof—may be used to transfer/signal personalized audio metadata as described herein as a personalized audio playlist.

A personalized audio playlist as described herein may be defined for a media presentation based on the HLS syntax. In some embodiments, a specific tag (e.g., an EXT-X-MEDIA tag, a different tag, etc.) may be used in the personalized audio playlist to specify/define personalized audio presentations each of which represents a different (e.g., pre-defined, pre-specified, etc.) audio mix of a personalized audio program in the media presentation.

The personalized audio presentations as specified/defined by the personalized audio playlist may be used (as a mechanism) to support personalized audio by HLS-compliant adaptive streaming clients implementing techniques as described herein. More specifically, the personalized audio playlist (or a master playlist) may be generated/constructed based on syntax elements to enable/facilitate personalized audio.

FIG. 3A and FIG. 3B illustrate two examples of using HLS-related syntax elements in a personalized audio playlist to specify/define media streams and personalized audio presentations, audio program elements of which can be carried in the media streams to adaptive streaming clients.

As shown in FIG. 3A, a tag denoted as "EXT-X-STREAM-INF" may be used to specify/define a media bitstream (e.g., "BANDWIDTH=7680000", etc.) that can be used to deliver/transmit a single audio program element or multiple audio program elements in any personalized audio presentation in a plurality of personalized audio presentations (e.g., 104-A and 104-B of FIG. 1, 104-C of FIG. 2, etc.) of a personalized audio program in a media presentation from one or more media streaming servers to an adaptive streaming client. In some embodiments, the "EXT-X-STREAM-INF" tag includes an "AUDIO" attribute indicating the name ("personalized-audio-group" in the present example) of the personalized audio program in the media presentation.

Similarly, as shown in FIG. 3B, three "EXT-X-STREAM-INF" tags may be used to specify/define three media bitstreams each of which can be used to deliver/transmit a single audio program element or multiple audio program elements in any personalized audio presentation in a plurality of personalized audio presentations (e.g., 104-A and 104-B of FIG. 1, 104-C of FIG. 2, etc.) of a personalized audio program in a media presentation from one or more media streaming servers to an adaptive streaming client. The first of the three media bitstreams is a "low" bitrate bitstream (e.g., "BANDWIDTH=1280000", etc.). The second of the three media bitstreams is a "mid" bitrate bitstream (e.g., "BANDWIDTH=2560000", etc.). The third of the three media bitstreams is a "hi" bitrate bitstream (e.g., "BANDWIDTH=7680000", etc.). In some embodiments, each of the tags "EXT-X-STREAM-INF" includes an "AUDIO" attributes indicating the same name ("personalized-audio-group" in the present example) of the personalized audio program in the media presentation.

As shown in FIG. 3A and FIG. 3B, an "EXT-X-STREAM-INF" tag includes a CODECS attribute, which may contain a string (e.g., "ec-3.p", etc.) identifying codecs supporting personalized audio with respect to the personalized audio presentations defined in the personalized audio playlist. For example, the CODECS attribute may identify "ec-3.p" codecs that incorporate/implement personalized audio techniques (e.g., Dolby Audio for Personalization, Dolby Digital Plus, etc.).

As shown in FIG. 3A, a tag denoted as "EXT-X-MEDIA" may be used to specify/define a personalized audio presentation in a plurality of personalized audio presentations (e.g., 104-A and 104-B of FIG. 1, 104-C of FIG. 2, etc.) available for the media presentation. The personalized audio presentation includes one, two or more audio program elements in a plurality of audio program elements (e.g., 106 of FIG. 1) of the personalized audio program in the media presentation.

In some embodiments, the "EXT-X-MEDIA" tag, which defines the personalized audio presentation, includes a "GROUP-ID" attribute indicating the same name ("personalized-audio-group" in the present example) of the personalized audio program in the media presentation, to which the personalized audio presentation belongs. The value of the "GROUP-ID" attribute matches the name of the personalized audio program as specified in the "AUDIO" attribute of the "EXT-X-STREAM-INF" tag(s) that are used to define the media bitstream(s) in the personalized audio playlist.

In some embodiments, the "EXT-X-MEDIA" tag, which defines the personalized audio presentation, includes an "NAME" attribute indicating a specific name of the personalized audio presentation. The value of the "NAME" attribute may represent a human-readable string suitable that can be presented by a media application of an adaptive streaming client (e.g., a consumer device, etc.) to an end user.

In some embodiments, the "EXT-X-MEDIA" tag, which defines the personalized audio presentation, includes one, two or more "URI" attributes each of which indicates a Universal Resource Identifier (e.g., per audio program element, etc.) referencing a media playlist for a respective audio program element of the one, or two or more audio program elements that make up the personalized audio presentation. Examples of personalized audio playlists, media playlists, MPD, etc., may include, but are not necessarily limited to only, XML files, M3U8 files, manifest files, index files, etc.

In some embodiments, an audio program element in the personalized audio presentation may be partitioned (e.g., the personalized audio packager (204) of FIG. 2, a media system, etc.) time-wise into audio segments in a plurality of (e.g., contiguous, etc.) time durations that cover a time period as represented in the media presentation. Examples of time durations into which the personalized audio presentation can be partitioned may include, but are not necessarily limited to only, any of: relatively long durations, relatively short durations, fixed time intervals, sub-second time intervals, one-second time intervals, three-second time intervals, ten-second time intervals, twenty-second time intervals, etc. Audio content portion—of the audio program element—in a time duration in the plurality of time durations may be encoded into one or more different audio segments. In some embodiments, the one or more different audio segments represents the same audio content portion (of the audio program element) in the time duration at a respective target bitrate (for downloading and/or decoding) in a plurality of one or more different target bitrates.

In some embodiments, the higher the target bitrate to which an audio segment is encoded, the higher the perceptual quality with which the audio segment represents the audio content portion of the audio program element. Any one of the one or more different audio segments can be accessed, switched to, downloaded, decoded, etc., at a corresponding target bitrate for the purpose of rendering the audio content portion (of the audio program element) for the time duration of the time period represented in the media presentation by an adaptive streaming client, based at least in part on one or more of current network conditions, network resources (e.g., bandwidth, etc.), decoding complexity, perceptual qualities, etc.

The media playlist for the audio program element as referenced/specified by the "URI" attribute may comprise multiple sets of audio segment entries that reference multiple sets of audio segments for the audio program element. Audio segments in a particular set of audio segments can be transmitted to an adaptive streaming client at a particular target bitrate. The adaptive streaming client may access/download any audio segment in the multiple sets of audio segments at runtime, and use the accessed audio segments to assemble a bitrate-adaptive audio stream of the audio program element for rendering at the adaptive streaming client. The bitrate-adaptive audio stream of the audio program element as assembled by the adaptive streaming client may or may not be mixed bitrates.

In some embodiments, the "EXT-X-MEDIA" tag, which defines the personalized audio presentation, includes a "CHARACTERISTICS" attribute indicating (e.g., exactly, etc.) one Uniform Type Identifier (UTI) for the audio program element that describes the role of the audio program element. FIG. 4 illustrates a list of example UTIs for a plurality of audio program elements (e.g., 106 of FIG. 2, etc.) in a personalized audio program of a media presentation.

In some embodiments, if there are multiple audio program elements in the personalized audio presentation, each UTI may be separated by a comma. The order of the UTIs for the multiple audio program elements in the "CHARACTERISTICS" attribute may match the order of the URI attributes for the multiple audio program elements. For instance, the first UTI for the first audio program element of the multiple audio program elements in the CHARACTERISTICS attribute may refer to the first URI attribute for the same first audio program element as listed in the "EXT-X-MEDIA" tag.

For the purpose of illustration only, a number of HLS-related attributes have been used to define personalized audio playlists, media bitstreams, personalized audio presentations, compositions of personalized audio presentations, resource locators for media playlists for the purpose of accessing audio segments of audio program elements in the personalized audio presentations, etc. It should be noted that in various embodiments, more or fewer attributes or other attributes can be used in addition to or in place of the attributes illustrated herein. For instance, a "LANGUAGE" attribute, if present, may reference the primary language of a personalized audio presentation. If the personalized audio presentation contains more than one language, then an "ASSOC-LANGUAGE" attribute may also be used to signal an associated language.

7. Example Dash-Related Syntax Elements

In a non-limiting implementation example, a DASH Syntax—as defined by DASH-related standards or proprietary extension thereof—may be used to transfer/signal personalized audio metadata as described herein as a part of a media presentation description.

A media presentation description (MPD) as described herein may be defined for a media presentation based on the DASH syntax. In some embodiments, specific parameters, attributes, values, etc., may be used in the MPD to specify/define personalized audio presentations each of which represents a different (e.g., pre-defined, pre-specified, etc.) personalized audio mix of a personalized audio program (or audio bundle) in the media presentation.

The personalized audio presentations as specified/defined by the MPD may be used (as a mechanism) to support personalized audio by DASH-compliant adaptive streaming clients implementing techniques as described herein. More specifically, the MPD may be generated/constructed based on syntax elements to enable/facilitate personalized audio.

To play a personalized audio presentation of the personalized audio program of the media presentation, a DASH adaptive streaming client first obtains the MPD for the media presentation. The MPD can be delivered using HTTP, email, thumb drive, broadcast, or other transports. By parsing the MPD, the DASH adaptive streaming client learns about a plurality of (available) personalized audio presentations for the media presentation among other things. Using this information and other information in the MPD, the DASH adaptive streaming client selects a specific personalized audio presentation from among the plurality of personalized audio presentations (e.g., 104-A and 104-B of FIG. 1, 104-C of FIG. 2, etc.); selects appropriate Adaptation Sets for the specific personalized audio presentation of the media presentation; selects Representations and Segments in the selected Adaptation Sets for the specific personalized audio presentation of the media presentation; accesses/downloads encoded audio data (e.g., audio samples, MDCT coefficients, etc.) in the Representation and Segments as audio streams using HTTP GET requests; decode/render the audio data in the audio streams; etc. The adaptive streaming client may be equipped with buffers to deal with network throughput variations, decoding complexity variations, etc., at runtime. The adaptive streaming client may monitor network bandwidth fluctuations, decoding statistics, etc., while performing the foregoing operations. Depending on its measurements and statistics related to network bandwidth, errors, decoding complexity, etc., the adaptive streaming client may dynamically adapt to the real time available network bandwidth, the real time processing load requirement, the highest available perceptual quality, etc., by fetching or switching to different Representations and Segments (e.g., of the same personalized audio presentation, etc.) encoded for different target bitrates from time to time.

In some embodiments, specific parameters, attributes, values, etc., used to specify/define/access the plurality of personalized audio presentations (e.g., 104-A and 104-B of FIG. 1, 104-C of FIG. 2, etc.) of the media presentation may be signaled within or without the scope of Adaptation Sets. In a non-limiting example, these parameters, attributes, values, etc., may be carried in the MPD at an Adaptation Set level or at a Content Component level. Signaling of the parameters, attributes, values, etc., used to specify/define/access the plurality of personalized audio presentations (e.g., 104-A and 104-B of FIG. 1, 104-C of FIG. 2, etc.) depends on how audio program elements of the personalized audio program in the media presentation are multiplexed into Adaptation Sets. If an Adaptation Set contains multiple audio program elements, the Adaptation Set can contain a Content Component for each of the audio program elements. Each Content Component may include syntax elements and attributes illustrated in one or both of TABLES 4 and 5 below.

If an Adaptation Set contains a single audio program element, signaling of parameters, attributes, values, etc., (e.g., for the audio program element) can be moved from the Content Component level to the Adaptation Set level. More specifically, the Adaptation Set contains no Content Components, the syntax elements and attributes as defined in one or both of TABLES 4 and 5 are signaled directly within the Adaptation Set.

Additionally, optionally, or alternatively, if an Adaptation Set contains all audio program elements for only one single personalized audio presentation (or preselection), and is not referenced by other personalized audio presentations (or other preselections), signaling of parameters, attributes, values, etc., (e.g., for the personalized audio presentation) can be moved from the Content Component level to the Adaptation Set level. More specifically, the Adaptation Set contains no Content Components but the syntax elements and attributes as defined in one or both of TABLES 4 and 5 are signaled directly within the Adaptation Set.

In some embodiments, new capabilities provided by techniques for immersive or interactive personalized presentations as described herein may be signaled/indicated to the adaptive streaming client. TABLES 4 and 5 below illustrate example DASH-related syntax elements and attributes used in a media presentation description to specify/define media streams and personalized audio presentations audio program elements of which can be carried in the media streams to adaptive streaming clients. For Adaptation Sets to support personalized audio, some or all of the syntax elements and attributes (including but not limited to namespace, schemeIdUri, etc.) may be used for signaling to the adaptive streaming client.

TABLE 4 below illustrates example (e.g., new) values of existing DASH-related syntax elements and attributes used in a media presentation description to specify/define media streams and personalized audio presentations audio program elements of which can be carried in the media streams to adaptive streaming clients.

TABLE 4

| Parameter | Use | Description |
|---|---|---|
| Role | 1 | Feasible values as defined by ISO/IEC 23009-1 and as defined by MPEG[ref]. In context with component audio streams only the role of the adaptation set tagged as being the entry point provides the full context of a potentially larger audio presentation. |
| Accessibility | 0 . . . 1 | This element indicates Accessibility features of a preselection. |
| @lang | 1 | Indicates the language code of the presentation. The syntax and semantic according to RFC 5646 shall be used. If not present the language may be unknown.<br>This attribute indicates the dominant language of a preselection. |
| @mimeType | 1 | "audio/mp4" |
| @codecs | 1 | This attribute indicates the codec and resources required to decode a preselection.<br>(this part is specific to AC-4)<br>For AC-4 elementary streams, the value of the codecs element shall be created according to the syntax described in RFC6381.<br>The value consists of the dot-separated list of the 4 following parts of which the latter three are represented by two-digit hexadecimal numbers: |

TABLE 4-continued

| Parameter | Use | Description |
|---|---|---|
| | | The fourCC "ac-4"<br>The bitstream_version as indicated in the AC-4 decoder specific information<br>The presentation_version as indicated for the presentation in the AC-4 decoder specific information<br>The mdcompat parameter as indicated for the presentation in the AC-4 decoder specific information<br>Example: "ac-4.02.01.03"<br>The AC-4 decoder specific information is described in Annex E.6 of the AC-4 Part 2.<br>(this part is specific to MPEG-H Audio)<br>For MPEG-H Audio elementary stream the value of the codec element shall be created according to ISO/IEC 23008-3 Amendment 2.<br>The value is a dot-separated combination of two parts:<br>The first part is the fourCC "mhm1" or "mhm2" and corresponds to the "fourCC" code used in the ISOBMFF sample entry type for MPEG-H Audio as defined in ISO/IEC 23008-3 Amendment 2.<br>"mhm1" shall be used for a MPEG-H Audio single stream, i.e. a self-contained, complete audio stream that contains all audio components<br>"mhm2" shall be used for all audio streams that are part of a multi-stream or hybrid delivery presentation.<br>The second part is the MPEG-H Audio profileLevelIndicator as specified in ISO/IEC 23008-3 Amendment 3 Table 39, represented by a two-digit hexadecimal number.<br>Example: "mhm1.0D" for single-stream MPEG-H Audio Low Complexity Profile Level 3 |
| @audioSamplingRate | 1 | Example: "48000" for 48 kHz<br>(this part is specific to AC-4)<br>The indication shall be derived from the parameters b_sf_multiplier, sf_multiplier and dsi_sf_multiplier inside the decoder specific information described in Table 249 Annex E.8 of AC-4 Part 2. |
| audioChannelConfiguration | 1 | Specifies the channel configuration and layout. For example, mono, stereo, or 5.1 surround.<br>(this part is specific to AC-4)<br>For AC-4 the Audio Channel Configuration element shall use the "tag:dolby.com,2015:dash:audio_channel_configuration:2015" scheme URI. The value element shall contain a six-digit hexadecimal representation of the 24-bit speaker group index bit field, which describes the channel assignment of the referenced AC-4 bit stream according to the referenced table 221 in Annex A of AC-4 Part 2.<br>For content that conveys audio objects that could be rendered to positions/coordinates independent from speaker configurations, the value "000000" shall be indicated.<br>If this parameter is set to "000000" clients should refer to the attributes @audioModeExtension from the newNameTBDElement in order to present meaningful information about the available rendering options to the user.<br>(this part is specific to MPEG-H Audio)<br>For MPEG-H Audio this element contains a "ChannelConfiguration" value as defined in ISO/IEC 23001-8.<br>Examples: The following ChannelConfiguration values are valid for MPEG-H LC Profile Level 3: 1-7, 9-12, 14-17 or 19. |

TABLE 5 below illustrates example new DASH-related syntax elements and attributes used in a media presentation description to specify/define media streams and personalized audio presentations audio program elements of which can be carried in the media streams to adaptive streaming clients.

TABLE 5

| Parameter | Use | Description |
|---|---|---|
| @preselectionID | 1 | (this part is specific to AC-4)<br>This attribute indicates the AC-4 presentation in an AC-4 TOC which an adaptation set relates to.<br>(this part is specific to MPEG-H Audio)<br>For MPEG-H Audio this attribute indicates a MPEG-H Audio Preset as defined in the MPEG-H Audio Metadata (MAE). It contains the mae_groupPresetID as described in ISO/IEC 23008-3 Table 150. |
| @mainStream | 1 | This attribute is used on Adaptation Sets. It indicates the main stream of a bundle |
| @audioBundleID | 1 | This attribute is used on Adaptation Sets. It indicates the bundle ID |
| @streamID | 1 | This attribute is used on Adaptation Sets. It indicates the ID of a stream within a bundle. |

TABLE 5-continued

| Parameter | Use | Description |
|---|---|---|
| | | The @streamID attribute maps the Adaptation Set from MPD scope to next generation audio decoder scope and can be used for interfacing system level and next generation audio decoder functionality. |
| EssentialProperty | 0 . . . 1 | This element identifies Adaptation Sets that contain only partial audio. To decode the data contained in such an Adaptation Set, the client needs to receive one or more other Adaptation Sets, which are referred by the value attribute |
| @schemeIDURI | 1 | urn:mpeg:dash:partial:2016 |
| @value | 1 | Contains the comma-separated list of Adaptation Set IDs and Content Component IDs that are required for decoding of the audio. The $1^{st}$ entry in the list always refers to the main stream of a Bundle. |
| Label | 0 . . . 1 | This element gives a human-readable description of the content represented by a Preselection. The @value attribute shall contain a string of text that describes the purpose of the related stream. |
| @lang | 1 . . . N | The language of the text in the label. The syntax and semantic according to RFC 5646 shall be used. |
| @value | 1 . . . N | Shall contain a string of text that describes the purpose of the related stream. |
| @preselectionComponents | 1 | The list of Adaptation Sets and Content Components which are necessary to present the Preselection, i.e. that need to be sent to the NGA audio decoder. |
| @priority | 0 . . . 1 | This attribute indicates the priority of a preselection. |
| @isInteractive | 0 . . . 1 | A flag that indicates if set to 1 that the audio bundle contains audio elements with associated metadata, which enables user interactivity (e.g. changing gain or position). When this flag is set to 0, no user interactivity of any kind is available. This attribute may be used to determine the need for initializing the user interactivity interface in the receiver application environment. |
| @audioRenderingIndication | 0 . . . 1 | Additional parameter to enhance the channel configuration parameter in case of immersive audio or audio bundles that contain audio objects. The audioChannelConfiguration indicates the channel layout with which the content has been produced. If the stream contains a channel-independent audio element, the channel configuration becomes 0. To avoid losing the notion of the production channel layout, audioRenderingIndication contains the reference layout value. Apart from that, it indicates other properties like pre-rendered binaural content. This attribute contains a list of key-words that indicates certain properties of the audio which cannot be indicated by the AudioChannelConfiguration element. |

In some embodiments, syntax elements and attributes (e.g. "Role", "@lang", "Accessibility", etc.) of a parent element (e.g., which corresponds to a personalized audio presentation or Adaptation Set) override corresponding indications of referred Adaptation Sets and Content Component elements (e.g., under the parent element, referenced/specified by the parent element, etc.).

In hybrid content delivery and personalization use cases under personalized audio, audio content (e.g., as prepared by a media streaming service, a media streaming server, a media broadcasting system, the personalized audio packager (204) of FIG. 2, etc.) may be represented by multiple Adaptation Sets which host individual audio program elements (e.g., music, dialog, and audio effects) that need to be combined in order to produce a personalized audio presentation (or preselection). In the hybrid content delivery and personalization use cases, when a "Role" element in TABLE 4 appears for an audio preselection with component audio as represented by the individual audio program elements, the "Role" element describes the whole experience represented by the personalized audio presentation instead of a single audio component (e.g., a single individual audio program element, etc.) in the personalized audio presentation. This is different use cases in other approaches not related to personalized audio, under which a "Role" element with a value "main" is used to indicate a preferred Adaptation Set.

In the hybrid content delivery and personalization use cases, when an "Accessibility" element in TABLE 4 appears for a personalized audio presentation with component audio as represented by the individual audio program elements, the "Accessibility" element describes the whole experience represented by the personalized audio presentation instead of a single audio component (e.g., a single individual audio program element, etc.) in the personalized audio presentation.

An "@lang" attribute in TABLE 4 may be interpreted in a manner similar to how the "Role" element is interpreted as described above. In the hybrid content delivery and personalization use cases, when an "@lang" attribute appears for a personalized audio presentation with component audio as represented by the individual audio program elements, the "@lang" attribute indicates the dominant language (presentation language) of the whole experience of the personalized audio presentation instead of a single audio component (e.g., a single individual audio program element, etc.) in the personalized audio presentation. The personalized audio presentation may still refer to Adaptation Sets which indicate different dominant/target languages. An example use case is that of ducked original English dialogue in a German localization as compared with a use case of the same original English dialogue track or non-ducked in an English localization.

In the hybrid content delivery and personalization use cases, some syntax elements and attributes such as "@mimeType", "@codecs", "@audioSampleRate", etc., in TABLE 4 may be used in compliance with MPEG DASH standards. The "@codecs" attributes in connection with Adaptation Sets, which refer to the same audio bundle, may identify the same codec. Child elements of the Adaptation Set may use different profiles or levels of the same codec.

Multiple descriptors, parameters, elements, attributes, etc., related to a given personalized audio presentation, such as "EssentialProperty" (for identifying partial audio) in multiple individual Adaptation Sets of the personalized audio presentation, may refer to one or more same audio streams in order to present a whole experience of the personalized audio presentation. The value indicated by the "@codecs" attribute as part of the personalized audio presentation (or preselection) overrides values of other "@codecs" attributes as indicated on the multiple individual Adaptation Sets or multiple individual Representations referenced in connection with the personalized audio presentation (or preselection).

In the hybrid content delivery and personalization use cases, some syntax elements and attributes in TABLE 4 such as "audioChannelConfiguration", etc., may be used in compliance with ISO/IEC 23009-1 standards. In particular, the "audioChannelConfiguration" element specifies a channel configuration and layout such as mono, stereo, 5.1 surround, or the like. Object-based audio delivered via DASH may or may not be coded for a specific output channel configuration. In such cases, the "audioChannelConfiguration" may be ignored when the object-based audio can be rendered on arbitrary output configurations. In some embodiments, an "audioRenderingIndication" element in TABLE 5 may be used in order to provide a meaningful indication to an adaptive streaming client and a user thereof.

In some embodiments, a "preselectionID" element in TABLE 5, which may be a numeric value, is used to identify (e.g., uniquely among the plurality of personalized audio presentations within the media presentation, etc.) a personalized audio presentation.

In some embodiment, an "@audioBundleID" attribute in TABLE 5 is used to identify (e.g., uniquely among a plurality of audio bundles within a Period, etc.) a personalized audio program (or bundle) in the media presentation.

In some embodiment, a "@mainStream" attribute in TABLE 5 is used to identify a main stream (or audio program element) of the personalized audio program in the media presentation. In some embodiments, only one audio program element of the personalized audio program in the media presentation is tagged or identified as a main stream.

In some embodiments, every personalized audio presentation supported by audio program elements of the personalized audio program in the media presentation references the main stream as identified by the "@mainStream" attribute as discussed above.

In some embodiment, an "@streamID" attribute in TABLE 5 is used to identify a stream (or an audio program element carried as the stream).

In some embodiments, an "EssentialProperty" descriptor in TABLE 5 is used to indicate that an audio stream is a partial audio stream which carries a part but not all of a personalized audio presentation. In some embodiments, each Adaptation Set in the personalized audio presentation has no more than one "EssentialProperty" descriptor of the kind used to indicate a partial audio stream in connection with the personalized audio presentation. In some embodiments, all identifiers (IDs) of Adaptation Sets and/or IDs of ContentComponents listed/identified by the "@value attribute" of the "EssentialProperty" descriptor have their respective unique values.

In some embodiments, a "Label" element is used to provide a human-readable description of the content represented by a personalized audio presentation. Each "value" attribute in one or more "value" attributes of the "Label" element may be a string limited to a maximum number (e.g., 128, 256, etc.) of characters, and is associated/paired with a respective "@lang" attribute.

In some embodiment, an "@preselectionComponents" attribute is used to identify all Adaptation Sets and Content Components that are used in a personalized audio presentation (or preselection). Unique identifiers may be used to identify all the Adaptation Sets and Content Components.

In some embodiments, an "@priority" attribute is used to identify the priority of a personalized audio presentation. If present, priorities of different personalized audio presentations in the same personalized audio program may be uniquely assigned. In some embodiments, the lower a value of an "@priority" attribute is, the higher the priority of a personalized audio presentation having the value of the "@priority" attribute. Numbering of values of priorities may start with 1.

In some embodiments, an "audioRenderingIndication" element contains a list of key-words that indicate certain properties that are relevant for audio rendering, as illustrated in TABLE 6 below.

TABLE 6

| Key word | Description |
| --- | --- |
| hph | Indicates that content is pre-rendered for consumption with headphones. |
| 2da | Indicates that the content has only elements to be rendered in a plane (i.e. 2-dimensional audio). |
| 3da | Indicates that the content has elements with heights (i.e. 3-dimensional audio). |
| acpN | (this part is specific to MPEG-H Audio) For MPEG H. this tag indicates the reference channel layout. The number N is the value of the ChannelConfiguration as defined in ISO/IEC 23001-8. N shall have no leading zero. Valid numbers for N are 1-7, 9-12, 14-17 or 19 (this part is specific to AC-4) TBD |

In some embodiments, a "Preselection" element is used to host, or indicate presence of, properties of personalized audio presentations. The "Preselection" element can be transmitted in the MPD to indicate a personalized audio presentation that is available for user to select. The related audio program elements can be carried in a single or separate streams. A personalized audio presentation cannot span multiple personalized audio programs. The "Preselection" element is an orthogonal concept to Adaptation Sets. "Preselection" elements exist on Period level. In some embodiment, a candidate/potential personalized audio presentation as indicated by a "Preselection" element is not available for an adaptive streaming client to select and render if not all referenced Adaptation Sets or Content Components in the candidate/potential personalized audio presentation can be obtained. Each "Preselection" element may comprise component descriptors, syntax elements, attributes, etc., as illustrated in TABLE 7 below.

TABLE 7

| Element/attribute name | Use | Description |
| --- | --- | --- |
| Preselection | 1 | The preselection element is located on Period level. Unless explicitly noted the attributes and elements listed below shall be used as defined in Table 1. |
| @preselectionID | 1 | |
| @preselectionComponents | 1 | |
| @codecs | 1 | |
| @lang | 1 | |
| @priority | 0 . . . 1 | |
| @isInteractive | 0 . . . 1 | |
| @audioRenderingIndication | 0 . . . 1 | |
| Role | 1 | |
| Label | 0 . . . 1 | |
| Accessibility | 0 . . . 1 | |

8. Content Preparation and Streaming

Under techniques as described herein, personalized audio metadata that describes personalized audio presentations of a personalized audio program of a media presentation may be generated by a media system (e.g., media broadcast system, media streaming server, content provider, etc.). Some or all of the personalized audio metadata may be carried along with audio essence (e.g., audio sample data carried in each of audio program elements, etc.) in bitstreams to adaptive streaming clients. The personalized audio metadata may identify all audio program elements in the personalized audio program, all selectable personalized audio presentations of the personalized audio program, etc. An adaptive streaming client may access some or all of the personalized audio metadata and perform configuration operations such as selecting a specific personalized audio presentation or setting/selecting specific operational parameters related to the specific personalized audio presentation. In some embodiments, some or all of the configuration operations performed by the adaptive streaming client for personalized audio may be automatic, manually, partly automatic partly manually, etc.

To enable personalized audio for adaptive streaming clients, the media system, or a personalized audio packager (e.g., 204 of FIG. 2) therein, may be configured to support a maximum number of audio program elements for the personalized audio program in the media presentation. The maximum number of audio program elements may be set to a default value, for example, based on industry standards or extensions thereof. Additionally, optionally, or alternatively, the maximum number of audio program elements may be user configurable, system configurable, etc. In a non-limiting example embodiment, the media system may be configured to be capable of generating personalized audio metadata for at least 16 simultaneous audio program elements (e.g., respectively represented by input bitstreams, represented by input Dolby Digital Plus audio, etc.). For instance, each of the input audio program elements may be represented by a respective input bitstream in a plurality of input bitstreams (e.g., 106 of FIG. 2) that are received by the media system for the purpose of generating/specifying the personalized audio metadata.

In some embodiments, the personalized audio packager (204) may receive user input that identifies at least one personalized audio program that is to include the audio program elements (106). The personalized audio packager (204) may allow a user (e.g., of the media system, of the personalized audio packager (204), etc.) to manually set the name of the personalized audio program. Additionally, optionally, or alternatively, the personalized audio packager (204) may itself set the name of the personalized audio program automatically by a mechanism.

In some embodiments in which the personalized audio metadata comprises an "EXT-X-STREAM-INF" tag that references a personalized audio program, an "AUDIO" attribute may also be present in the personalized audio metadata and may have a value as the name of the personalized audio program.

In some embodiments, a "CODECS" attribute may be present in an "EXT-X-STREAM-INF" tag in the personalized audio metadata, and may have a value as "ec-3.p".

In some embodiments, a "BANDWIDTH" attribute may be present in an "EXT-X-STREAM-INF" tag in the personalized audio metadata, and may have a value as the sum of bitrates of various audio streams in a personalized audio presentation. Additionally, optionally, or alternatively, in some embodiments, the value of a "BANDWIDTH" attribute in the personalized audio metadata indicates the bitrate of the highest bitrate personalized audio presentation among a plurality of personalized audio presentations (e.g., 104-A and 104-B of FIG. 1, 104-C of FIG. 2, etc.) of a personalized audio program of a media presentation. A bitrate of a personalized audio presentation may be determined/calculated as the sum of bitrates of all audio program elements (or audio streams) that make up that personalized audio presentation.

In some embodiments, the media system, or a personalized audio packager (e.g., 204 of FIG. 2) therein, may be configured to support a maximum number of personalized audio presentations for the personalized audio program in the media presentation. The maximum number of audio program elements may be set to a default value, for example, based on industry standards or extensions thereof. Additionally, optionally, or alternatively, the maximum number of audio program elements may be user configurable, system configurable, etc. In a non-limiting example embodiment, the media system may be configured to be capable of generating personalized audio metadata for at least 16 selectable personalized audio presentations for the personalized audio program in the media presentation.

In some embodiments in which the personalized audio metadata comprises a plurality of "EXT-X-MEDIA" tags that respectively references a plurality of personalized audio presentations (e.g., 104-A and 104-B of FIG. 1, 104-C of FIG. 2, etc.) of the personalized audio program, "GROUP-ID" attributes of the "EXT-X-MEDIA" tags referencing the personalized audio presentations of the same personalized audio program in the media application may also be present in the personalized audio metadata and may have a value as the name of the personalized audio program.

In some embodiments, the personalized audio packager (204) may receive user input that identifies/adds one, two or more references to one, two or more audio program elements to be included in each personalized audio presentation in the plurality of personalized audio presentations (e.g., 104-A and 104-B of FIG. 1, 104-C of FIG. 2, etc.) of the personalized audio program in the media presentation. In some embodiments in which the personalized audio metadata comprises the plurality of "EXT-X-MEDIA" tags that respectively references the plurality of personalized audio presentations (e.g., 104-A and 104-B of FIG. 1, 104-C of FIG. 2, etc.) of the personalized audio program, for each audio program element that is part of a personalized audio presentation, in an "EXT-X-MEDIA" tag that references the personalized audio presentation, the personalized audio packager (204) adds a "URI" attribute and a UTI in a "CHARACTERISTICS" attribute. In some embodiments, the value of the UTI in the "CHARACTERISTICS" attribute may be automatically configured (e.g., from a data field of a bitstream representing that audio program element, etc.). In some embodiments, the order of the UTIs in the "CHARACTERISTICS" attribute matches the order of the "URI" attributes in relation to the plurality of audio program elements (106) that values of these "UTI" attributes and "URI" attributes represent.

In some embodiments, a personalized audio presentation configured by the personalized audio packager (204) comprises at least one "Complete Main" audio program element, at least one "Music and Effects" audio program element, at least one "Karaoke" audio program element, etc. In some embodiments, the personalized audio presentation comprises one or more additional audio program elements.

In some embodiments, the personalized audio metadata (e.g., the media presentation list (206), etc.) and the plurality of audio program elements (106) as prepared and configured by the personalized audio packager (204) of FIG. 2 can be made available to a wide variety of adaptive streaming clients, for example, over a content delivery network (CDN) 210.

Client behaviors implemented by various adaptive streaming clients supported by techniques as described herein may be implementation specific, standard specific, device specific, vendor specific, etc.

In some embodiments, an adaptive streaming client (e.g., 212 of FIG. 2) may be implemented as a part of a media player application (denoted as "Player" in FIG. 2) on a computing device 208. The computing device (208), or the adaptive streaming client (212) therein, may first retrieve some or all of the personalized audio metadata such as the personalized audio playlist (206), etc., for a personalized audio program of a media presentation from one or more media streaming servers. Some or all of the one or more media streaming servers may be original content provider servers, CDN caching servers in the CDN (210), etc.

In some embodiments, while parsing the personalized audio metadata such as a personalized audio playlist, the adaptive streaming client (212) detects a presence of a specific value in the personalized audio metadata such as an "ec-3.p" value in a "CODECS" attribute of an "EXT-X-STREAM-INF" tag in the personalized audio playlist (206). The presence of the 'ec-3.p' value in the "CODECS" attribute of the "EXT-X-STREAM-INF" tag indicates that personalized audio is enabled in the media presentation. In response to detecting the presence of the specific value in the personalized audio metadata, the adaptive streaming client (212) can proceed to identify a personalized audio presentation in a personalized audio program in the media presentation, for example by recognizing the syntax of any "EXT-X-MEDIA" tags with a "GROUP-ID" attribute that has a value matching the value of the "AUDIO" attribute in the "EXT-X-STREAM-INF" tag in the personalized audio playlist (206).

In some embodiments, the adaptive streaming client (212) makes available to application logic of a target application (denoted as "Target App" in FIG. 2) the names of a plurality of personalized audio presentations (e.g., 104-A and 104-B of FIG. 1, 104-C of FIG. 2, etc.) that make up (or are included in) the personalized audio program in the media presentation, as well as the languages (if signaled in the personalized audio metadata) and roles of (e.g., component) audio program elements of the personalized audio program. The adaptive streaming client (212) may interoperate with the application logic to make available at least one method to select any of the plurality of personalized audio presentations (e.g., 104-A and 104-B of FIG. 1, 104-C of FIG. 2, etc.) at any point before or during playback in connection with the media presentation.

In some embodiments, the computing device (208), or the target application, is configured to present, based on the personalized audio metadata, a list of selectable personalized audio presentations (e.g., a plurality of personalized audio presentations (e.g., 104-A and 104-B of FIG. 1, 104-C of FIG. 2, etc.) of a personalized audio program in a media presentation, etc.) to a user of the computing device (208); to receive user input specifying a specific personalized audio presentation (e.g., 104-C) in the list of selectable personalized audio presentations; etc. In some embodiments, the computing device (208), or the application logic therein, presenting the names of all personalized audio presentations as parsed from the personalized audio metadata to a user of the computing device (208) for selection before a playback of the media presentation starts.

In some embodiments, in some operational scenarios, the computing device (208) may comprise an automatic selection mechanism that automatically selects the specific personalized audio presentation (104-C) in the list of selectable personalized audio presentations, for example based on a "DEFAULT" tag, an "AUTOSELECT" tag, a location property or the like of the computing device (208) or the user of the computing device (208). Additionally, optionally, or alternatively, in various embodiments, any combination of these and other methods of selecting a specific personalized audio presentation from among a plurality of personalized audio presentations (e.g., 104-A and 104-B of FIG. 1, 104-C of FIG. 2, etc.) in a personalized audio program in a media presentation may be used.

Once a personalized audio presentation has been selected, the adaptive streaming client (208) may simultaneously download and synchronize all audio program elements which are referenced by the personalized audio metadata (e.g., the personalized audio playlists (206), etc.) as linked to the specific personalized audio presentation. These audio program elements may be unpacked by the adaptive streaming client (208) from transport stream (TS) packets and passed to one or more decoders in the computing device (208). In some embodiments, the client parses the "CHARACTERISTICS" attribute to determine/understand the role of each audio program element in the personalized audio presentation.

In response to selecting the specific personalized audio presentation (104-C), the computing device, or the adaptive streaming client (212) therein, may then sends one or more streaming requests that identify the specific personalized audio presentation (104-C) to the one or more media streaming servers. In response to receiving the one or more streaming requests, the one or more media streaming servers deliver one, two or more audio program elements (e.g., 106-D and 106-E of FIG. 2) that completely, collectively, etc., make up the specific personalized audio presentation to the adaptive streaming client (212). The audio program elements (106-D and 106-E) may be delivered in a bitrate-adaptive stream that comprises media representations, media segments, etc., that may or may not be encoded to different target bitrates. The adaptive streaming client (212) may monitor network conditions, network bandwidths, decoding statistics, decoding complexities, audio perceptual qualities, etc., in real time or near real time and may switch between different media presentations, different media segments, etc., for each of some or all of the audio program elements (106-D and 106-E) for the specific personalized audio presentation of the personalized audio program in the media presentation.

The computing device (208) may be configured to support selecting or switching to new personalized audio presentations in the media presentation, for example based at least in part on user input. In some embodiments, upon selection of (or switching to) a new personalized audio presentation the adaptive streaming client begins downloading any changed audio program elements (e.g., new audio program elements of the new personalized audio presentation) immediately, and begin presenting/rendering the new personalized audio presentation no later than a certain time constraint or a certain segment length constraint such as no later than a certain number (e.g., two, three, etc.) of HLS segment lengths from the moment of the selection of the new personalized audio presentation.

Personalized audio techniques as described herein may be implemented to allow for control of relative volume levels of different audio program elements in a personalized audio presentation. In some embodiments in which a personalized audio presentation contains two or more audio program elements, the adaptive streaming client (212) may be configured to expose relative volume level control to the application logic, which may for example expose to the user of the computing device (208) for controlling/specifying relative volume levels amongst the audio program elements of the personalized audio presentation. In some embodiments, by default the relative volume level control is set to 0, which corresponds to a mixing ratio of 1:1.

In some embodiments, any of the components depicted in FIG. 2 may be implemented with software, hardware, a combination of software and hardware, etc.

In some embodiments, some or all of techniques as described herein can be packaged in a decoder deliverable (e.g., DAA, etc.). Vendors can integrate the decoder deliverable (or decoder) with their products.

An adaptive streaming client (e.g., 208) as described herein may set specific values for a personalized audio presentation to indicate that the personalized audio presentation comprises multiple audio program elements (e.g., two audio program elements, etc.). The adaptive streaming client (208) may operate in a specific mode (e.g., "Dual Decoding," etc.) in which the adaptive streaming client (208) performs audio processing operations at least some of which distinguish a main bitstream from one or more associated bitstreams (one or more non-main bitstreams). For example, when passing an unpacked bitstream to the decoder(s) of the adaptive streaming client (208), the adaptive streaming client can correctly identify the unpacked bitstream as a main bitstream or an associated bitstream.

In some embodiments, when presenting a personalized audio presentation with only one audio program element, the audio program element may be considered as the main bitstream, for example for the purpose of performing subsequent audio processing operations.

In some embodiments, when presenting a personalized audio presentation with two or more audio program elements, one of the two or more audio program elements may have a "Role" attribute value of "Complete Main," "Music and Effects," etc. An audio program element that has this "Role" attribute value can be considered as the main bitstream of the personalized audio presentation. The other audio program element(s) in the two or more audio program elements of the personalized audio presentation can be considered as associated bitstream(s).

9. Example Process Flows

Figure 5A:
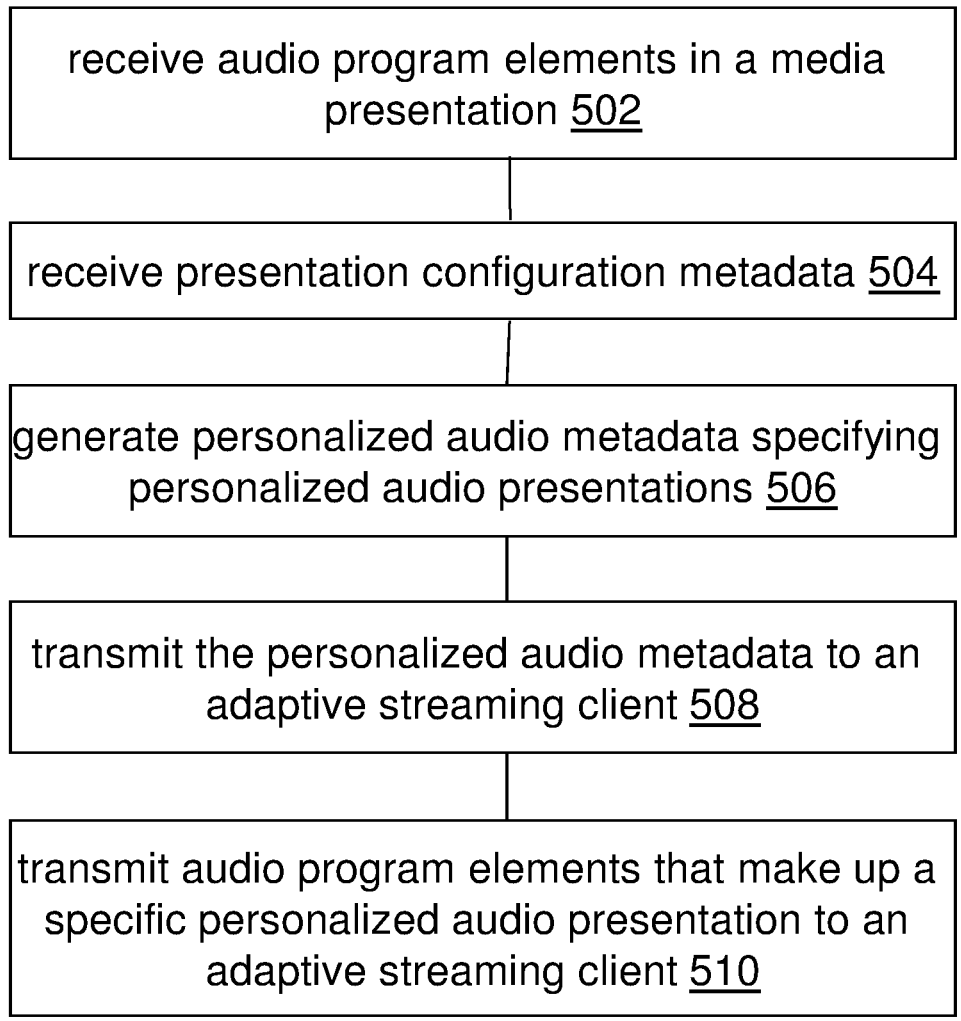
FIG. 5A and FIG. 5B illustrate example process flows.

FIG. 5A illustrates an example process flow according to an example embodiment of the present invention. In some example embodiments, one or more computing devices or components may perform this process flow.

In block 502, a media system (e.g., comprising or operating in conjunction with the packager (204) of FIG. 2, etc.) receives a plurality of audio program elements of a personalized audio program in a media presentation as first input.

In block 504, the media system receives presentation configuration metadata in connection with the personalized audio program in the media presentation as second input.

In block 506, the media system generates, based at least in part on the plurality of audio program elements in the first input and the presentation configuration metadata in the second input, personalized audio metadata that specifies a plurality of personalized audio presentations for the personalized audio program in the media presentation.

In block 508, the media system causes the personalized audio metadata that specifies the plurality of personalized audio presentations to be transmitted to an adaptive streaming client in response to receiving a media presentation request by the adaptive streaming client for the media presentation.

In block 510, the media system causes one or more audio program elements that make up a specific personalized audio presentation to be transmitted to the adaptive streaming client in response to receiving one or more subsequent media streaming requests for the one or more audio program elements. The adaptive streaming client originates the one or more media streaming requests for the one or more audio program elements after the adaptive streaming client (a) receives the personalized audio metadata as requested with the media presentation request and (b) uses the personalized audio metadata to select the specific personalized audio presentation, from among the plurality of personalized audio presentations.

In an embodiment, the plurality of audio program elements of the personalized audio program in the media presentation includes other audio program elements other than the one or more audio program elements that make up the specific personalized audio presentation; none of the other audio program elements are transmitted to the adaptive streaming client.

In an embodiment, any remaining audio program elements in the plurality of audio program elements other than the one or more audio program elements are prevented from being transmitted to the adaptive streaming client. The remaining audio program elements may be used in one or more other personalized audio presentations, in the plurality of personalized audio presentations, other than the specific personalized audio presentation selected by the adaptive streaming client.

In an embodiment, the media system is further configured to cause one or more second audio program elements that make up a second specific personalized audio presentation to be transmitted to the adaptive streaming client in response to receiving one or more second subsequent media streaming requests for the one or more second audio program elements. The media streaming client originates the one or more second media streaming requests for the one or more audio program elements after the adaptive streaming client (a) receives the personalized audio metadata as requested with the media presentation request, and (b) uses the personalized audio metadata to select the second specific personalized audio presentation, from among the plurality of personalized audio presentations. The one or more second audio program elements of the second specific personalized audio presentation may comprise at least one audio program element that is not included in the one or more audio program elements of the specific personalized audio presentation. Additionally, optionally, or alternatively, the one or more second audio program elements of the second specific personalized audio presentation may comprise at least one audio program element that is also included in the one or more audio program elements of the specific personalized audio presentation.

In an embodiment, the one or more audio program elements of the specific personalized audio presentation comprises a first audio program element that is generated based at least in part on one or more first microphone signals; the one or more audio program elements of the specific personalized audio presentation comprises a second different audio program element that is generated based at least in part on one or more second different microphone signals.

In an embodiment, the one or more first microphone signals are captured at a scene represented in the media presentation; the one or more second different microphone signals are captured at the same scene represented in the media presentation.

In an embodiment, the personalized audio metadata is delivered to the adaptive streaming client by one or more media servers over one or more networks; the one or more audio program elements are delivered to the adaptive streaming client by the same one or more media servers over the one or more networks.

In an embodiment, the personalized audio metadata is delivered to the adaptive streaming client by one or more first media servers over one or more networks; the one or more audio program elements are delivered to the adaptive streaming client by one or more second different media servers over the one or more networks.

In an embodiment, at least one of the one or more audio program elements is delivered to the adaptive streaming client via one or more content delivery networks (CDNs).

In an embodiment, the media system is further configured to perform: receiving a plurality of second audio program elements of a second personalized audio program in the media presentation as third input; receiving second presentation configuration metadata in connection with the second personalized audio program in the media presentation as fourth input; generating, based at least in part on the plurality of second audio program elements in the third input and the second presentation configuration metadata in the fourth input, second personalized audio metadata that specifies a plurality of second personalized audio presentations for the second personalized audio program in the media presentation; causing the second personalized audio metadata that specifies the plurality of second personalized audio presentations to be transmitted to a second adaptive streaming client in response to receiving a second media presentation request by the second adaptive streaming client for the media presentation; causing one or more second audio program elements that make up a specific second personalized audio presentation to be transmitted to the second adaptive streaming client in response to receiving one or more second subsequent media streaming requests for the one or more second audio program elements, the adaptive streaming client originating the one or more second media streaming requests for the one or more second audio program elements after the second adaptive streaming client (a) receives the second personalized audio metadata as requested with the second media presentation request and (b) uses the second personalized audio metadata to select the second specific personalized audio presentation, from among the plurality of second personalized audio presentations; etc.

In an embodiment, an audio program element in the one or more audio program elements is encoded into multiple sets of media segments; the multiple sets of media segments respectively correspond to multiple representations of the same audio program in multiple bitrates; each set of media segments in the multiple sets of media segments is encoded for being transmitted at a respective bitrate in the multiple bitrates.

In an embodiment, an audio program element in the one or more audio program elements is delivered to the adaptive streaming client as a bitrate-adaptive stream; the bitrate-adaptive stream comprises one or more first media segments encoded for being transmitted at a first bitrate and one or more second media segments encoded for being transmitted at a second bitrate.

In an embodiment, an audio program element in the one or more audio program elements is delivered to the adaptive streaming client as a bitrate-constant stream; the bitrate-constant stream comprises a set of media segments encoded for being transmitted at a constant bitrate.

In an embodiment, each of the one or more audio program elements covers a common time period represented in the media presentation.

In an embodiment, the media presentation further comprises a video program in addition to the personalized audio program.

In an embodiment, at least one personalized audio presentation in the plurality of personalized audio presentations is presented to a user of a computing device that includes the adaptive streaming client for selection.

In an embodiment, each personalized audio presentation in the plurality of personalized audio presentations represents a complete version of the personalized audio program in the media presentation, as predefined by an audio mixing professional.

In an embodiment, each personalized audio presentation in the plurality of personalized audio presentations comprises a unique combination of audio program elements in the plurality of audio program elements of the personalized audio program.

In an embodiment, each personalized audio presentation in the plurality of personalized audio presentations represents a proper subset of audio program elements in a set that includes the plurality of audio program elements of the personalized audio program.

In an embodiment, the one or more audio program elements in the specific personalized audio presentation are streamed to the adaptive streaming client concurrently.

In an embodiment, streaming a first audio program element in the specific personalized audio presentation to the adaptive streaming client is adapted in bitrate differently from streaming a second different audio program element in the specific personalized audio presentation to the adaptive streaming client is adapted in bitrate.

Figure 5B:
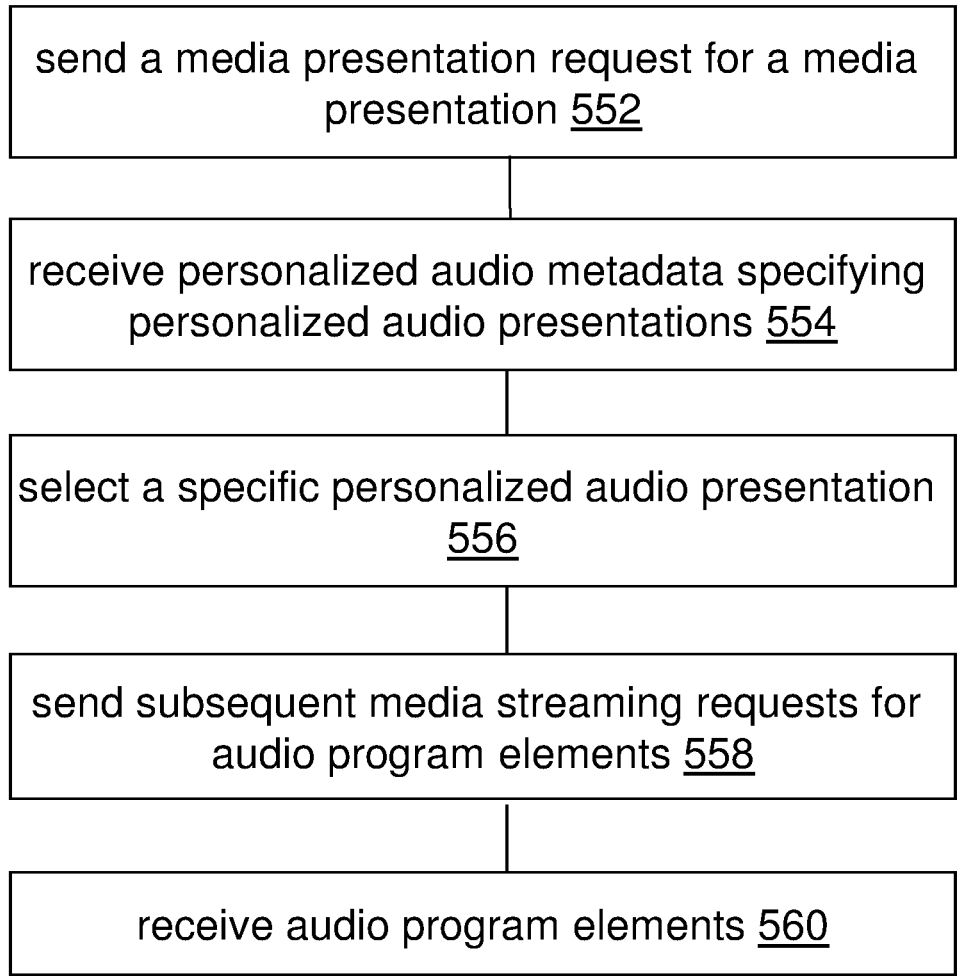

FIG. 5B illustrates an example process flow according to an example embodiment of the present invention. In some example embodiments, one or more computing devices or components may perform this process flow.

In block 552, an adaptive streaming client (e.g., 208 of FIG. 2, etc.) sends, to one or more media streaming servers over one or more networks, a media presentation request for a media presentation that comprises a personalized audio program. The personalized audio program comprises a plurality of audio program elements.

In block 554, the adaptive streaming client receives, from the one or more media streaming servers, personalized audio metadata that specifies a plurality of personalized audio presentations for the personalized audio program in the media presentation;

In block 556, the adaptive streaming client uses the personalized audio metadata to select a specific personalized audio presentation in the plurality of personalized audio presentations as identified in the personalized audio metadata received from the one or more media streaming servers. The specific personalized audio presentation is made up of one or more audio program elements in the plurality of audio program elements of the personalized audio program in the media presentation.

In block 558, the adaptive streaming client sends, to the one or more media streaming servers, one or more subsequent media streaming requests for the one or more audio program elements.

In block 560, the adaptive streaming client receives, from the one or more media streaming servers, the one or more audio program elements that make up the specific personalized audio presentation.

In an embodiment, the one or more audio program elements is received from the one or more media streaming servers via one of: HTTP Live Streaming (HLS), Dynamic Adaptive Streaming over HTTP (DASH), a non-HLS non-DASH streaming, etc.

In an embodiment, the adaptive streaming client is further configured to decode, mixing and rendering the one or more audio program elements as received as a part of the media presentation.

In an embodiment, the adaptive streaming client is further configured to avoid downloading any other audio program elements other than the one or more audio program elements that make up the specific personalized audio presentation.

In an embodiment, the adaptive streaming client is further configured to perform: using the personalized audio metadata to select a second specific personalized audio presentation in the plurality of personalized audio presentations as identified in the personalized audio metadata received from the one or more media streaming servers, the second specific personalized audio presentation being made up of one or more second audio program elements in the plurality of audio program elements of the personalized audio program in the media presentation; sending, to the one or more media streaming servers, one or more second subsequent media streaming requests for the one or more second audio program elements; receiving, from the one or more second media streaming servers, the one or more second audio program elements that make up the second specific personalized audio presentation; etc.

In an embodiment, at least one of the one or more media servers represents a caching server in a content delivery network (CDN).

In an embodiment, an audio program element in the one or more audio program elements is encoded into multiple sets of media segments; the multiple sets of media segments respectively correspond to multiple representations of the same audio program in multiple bitrates; each set of media segments in the multiple sets of media segments is encoded for being transmitted at a respective bitrate in the multiple bitrates; the adaptive streaming client is further configured to perform: streaming one or more first media segments in a first set of media segments, in the multiple sets of media segments, encoded for being transmitted at a first bitrate, wherein the one or more first media segments in the first set of media segments cover one or more first time durations of a period represented in the media presentation; collecting runtime measurement data in connection with one or more of network conditions, network resources, network bandwidths, decoding complexity, perceptual qualities, network throughput variations, decoding complexity variations, or transmission errors, network latencies, etc.; based on the runtime measurement data, determining whether a different set of media segments in the multiple sets of media segments should be streamed instead of the first set of media segments; in response to determining that a different set of media segments should be streamed instead of the first set of media segments, performing: identifying a second different set of media segments, in the multiple sets of media segments, encoded for being transmitted at a second different bitrate, streaming one or more second media segments in the second set of media segments, the one or more second media segments in the second set of media segments covering one or more second time durations, of the period represented in the media presentation, immediately following the one or more first time durations; etc.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
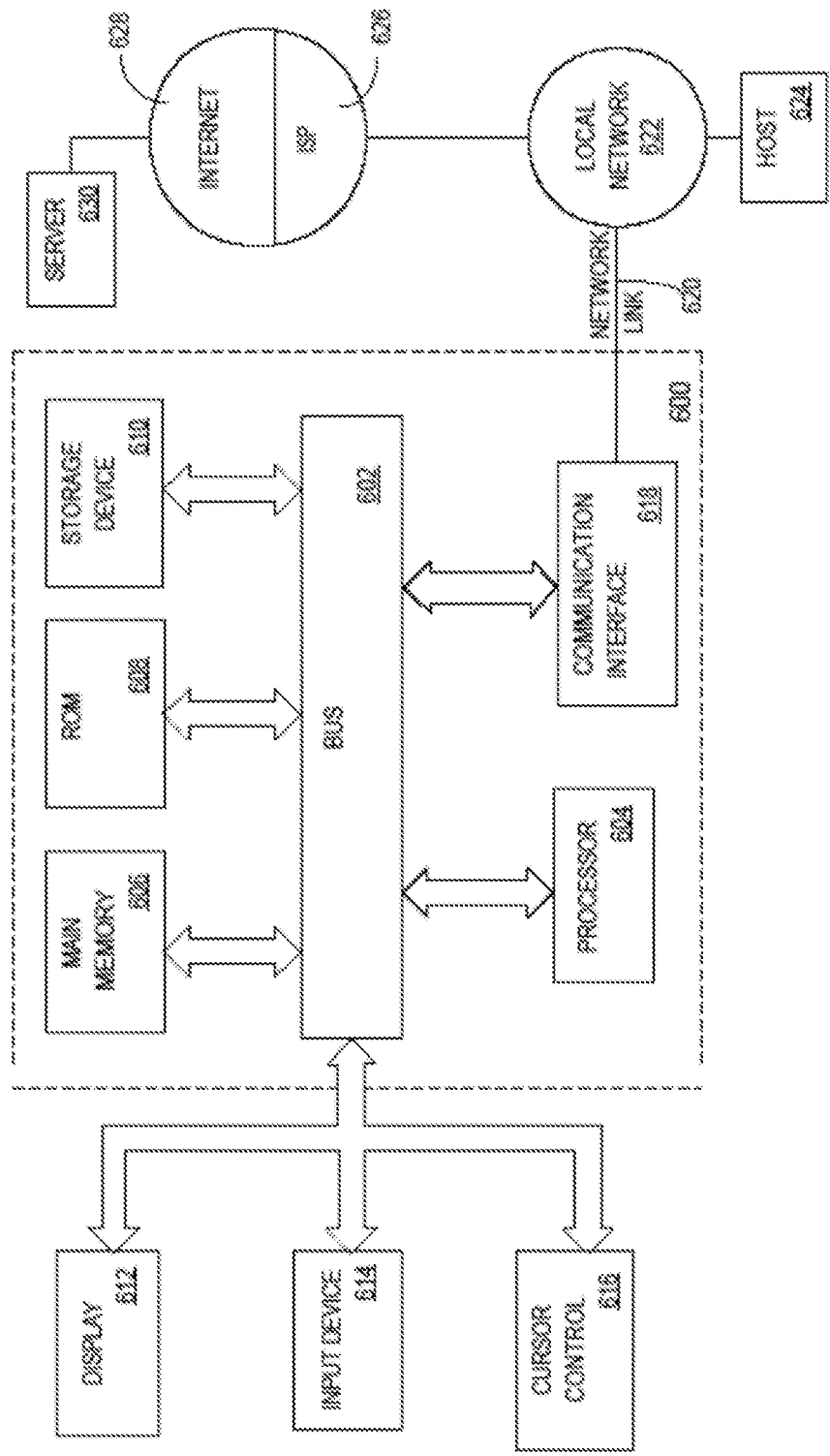
FIG. 6 illustrates an example hardware platform on which a computer or a computing device as described herein may be implemented.

For example, FIG. 6 is a block diagram that illustrates a computer system 600 upon which an example embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604.

A storage device 610, such as a magnetic disk or optical disk, solid state RAM, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

11. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for streaming personalized audio content to adaptive streaming clients, comprising:
receiving a plurality of audio program elements of a personalized audio program in a media presentation as first input;
receiving presentation configuration metadata in connection with the personalized audio program in the media presentation as second input;
generating, based at least in part on the plurality of audio program elements in the first input and the presentation configuration metadata in the second input, personalized audio metadata that specifies a plurality of personalized audio presentations for the personalized audio program in the media presentation;
causing the personalized audio metadata that specifies the plurality of personalized audio presentations to be transmitted to an adaptive streaming client in response to receiving a media presentation request from the adaptive streaming client for the media presentation;
causing one or more audio program elements that make up a specific personalized audio presentation to be transmitted to the adaptive streaming client in response to receiving one or more subsequent media streaming requests for the one or more audio program elements, wherein the adaptive streaming client originates the one or more media streaming requests for the one or more audio program elements after the adaptive streaming client (a) receives the personalized audio metadata as requested with the media presentation request and (b) uses the personalized audio metadata to select the specific personalized audio presentation, from among the plurality of personalized audio presentations.

2. The method of claim 1, wherein the plurality of audio program elements of the personalized audio program in the media presentation includes other audio program elements other than the one or more audio program elements that make up the specific personalized audio presentation, wherein none of the other audio program elements are transmitted to the adaptive streaming client.

3. The method of claim 1, wherein any remaining audio program elements in the plurality of audio program elements other than the one or more audio program elements are prevented from being transmitted to the adaptive streaming client.

4. The method of claim 3, wherein the remaining audio program elements are used in one or more other personalized audio presentations, in the plurality of personalized audio presentations, other than the specific personalized audio presentation selected by the adaptive streaming client.

5. The method of claim 1, further comprising: causing one or more second audio program elements that make up a second specific personalized audio presentation to be transmitted to the adaptive streaming client in response to receiving one or more second subsequent media streaming requests for the one or more second audio program elements, wherein the media streaming client originates the one or more second media streaming requests for the one or more audio program elements after the adaptive streaming client (a) receives the personalized audio metadata as requested with the media presentation request, and (b) uses the personalized audio metadata to select the second specific personalized audio presentation, from among the plurality of personalized audio presentations.

6. The method of claim 5, wherein the one or more second audio program elements of the second specific personalized audio presentation comprises at least one audio program element that is not included in the one or more audio program elements of the specific personalized audio presentation.

7. The method of claim 5, wherein the one or more second audio program elements of the second specific personalized audio presentation comprises at least one audio program element that is also included in the one or more audio program elements of the specific personalized audio presentation.

8. The method of claim 1, wherein the one or more audio program elements of the specific personalized audio presentation comprises a first audio program element that is generated based at least in part on one or more first microphone signals, and wherein the one or more audio program elements of the specific personalized audio presentation comprises a second different audio program element that is generated based at least in part on one or more second different microphone signals.

9. The method of claim 8, wherein the one or more first microphone signals are captured at a scene represented in the media presentation, and wherein the one or more second different microphone signals are captured at the same scene represented in the media presentation.

10. The method of claim 1, wherein the personalized audio metadata is delivered to the adaptive streaming client by one or more media servers over one or more networks, and wherein the one or more audio program elements are delivered to the adaptive streaming client by the same one or more media servers over the one or more networks.

11. The method of claim 1, wherein the personalized audio metadata is delivered to the adaptive streaming client by one or more first media servers over one or more networks, and wherein the one or more audio program elements are delivered to the adaptive streaming client by one or more second different media servers over the one or more networks.

12. The method of claim 1, further comprising:
receiving a plurality of second audio program elements of a second personalized audio program in the media presentation as third input;
receiving second presentation configuration metadata in connection with the second personalized audio program in the media presentation as fourth input;
generating, based at least in part on the plurality of second audio program elements in the third input and the second presentation configuration metadata in the fourth input, second personalized audio metadata that specifies a plurality of second personalized audio presentations for the second personalized audio program in the media presentation;
causing the second personalized audio metadata that specifies the plurality of second personalized audio presentations to be transmitted to a second adaptive streaming client in response to receiving a second media presentation request by the second adaptive streaming client for the media presentation;
causing one or more second audio program elements that make up a specific second personalized audio presentation to be transmitted to the second adaptive streaming client in response to receiving one or more second subsequent media streaming requests for the one or more second audio program elements, wherein the adaptive streaming client originates the one or more second media streaming requests for the one or more second audio program elements after the second adaptive streaming client (a) receives the second personalized audio metadata as requested with the second media presentation request and (b) uses the second personalized audio metadata to select the second specific personalized audio presentation, from among the plurality of second personalized audio presentations.

13. The method of claim 1, wherein an audio program element in the one or more audio program elements is encoded into multiple sets of media segments, wherein the multiple sets of media segments respectively correspond to multiple representations of the same audio program in multiple bitrates, and wherein each set of media segments in the multiple sets of media segments is encoded for being transmitted at a respective bitrate in the multiple bitrates.

14. The method of claim 1, wherein an audio program element in the one or more audio program elements is delivered to the adaptive streaming client as a bitrate-adaptive stream, and wherein the bitrate-adaptive stream comprises one or more first media segments encoded for being transmitted at a first bitrate and one or more second media segments encoded for being transmitted at a second bitrate.

15. The method of claim 1, wherein an audio program element in the one or more audio program elements is delivered to the adaptive streaming client as a bitrate-constant stream, and wherein the bitrate-constant stream comprises a set of media segments encoded for being transmitted at a constant bitrate.

16. The method of claim 1, wherein at least one personalized audio presentation in the plurality of personalized audio presentations is presented to a user of a computing device that includes the adaptive streaming client for selection.

17. The method of claim 1, wherein each personalized audio presentation in the plurality of personalized audio presentations comprises a unique combination of audio program elements in the plurality of audio program elements of the personalized audio program.

18. The method of claim 1, wherein each personalized audio presentation in the plurality of personalized audio presentations represents a proper subset of audio program elements in a set that includes the plurality of audio program elements of the personalized audio program.

19. The method of claim 1, wherein the one or more audio program elements in the specific personalized audio presentation are streamed to the adaptive streaming client concurrently.

20. The method of claim 1, wherein streaming a first audio program element in the specific personalized audio presentation to the adaptive streaming client is adapted in bitrate differently from streaming a second different audio program element in the specific personalized audio presentation to the adaptive streaming client is adapted in bitrate.

21. A method for accessing media presentations with personalized audio content, comprising:
sending, to one or more media streaming servers over one or more networks, a media presentation request for a media presentation that comprises a personalized audio program, wherein the personalized audio program comprises a plurality of audio program elements;
receiving, from the one or more media streaming servers, personalized audio metadata that specifies a plurality of personalized audio presentations for the personalized audio program in the media presentation;
using the personalized audio metadata to select a specific personalized audio presentation in the plurality of personalized audio presentations as identified in the personalized audio metadata received from the one or more media streaming servers, wherein the specific personalized audio presentation is made up of one or more audio program elements in the plurality of audio program elements of the personalized audio program in the media presentation;
sending, to the one or more media streaming servers, one or more subsequent media streaming requests for the one or more audio program elements that make up the specific personalized audio presentation;
receiving, from the one or more media streaming servers, the one or more audio program elements that make up the specific personalized audio presentation.

22. The method of claim 21, the one or more audio program elements is received from the one or more media streaming servers via one of: HTTP Live Streaming (HLS), Dynamic Adaptive Streaming over HTTP (DASH), or a non-HLS non-DASH streaming.

23. The method of claim 21, further comprising:
using the personalized audio metadata to select a second specific personalized audio presentation in the plurality of personalized audio presentations as identified in the personalized audio metadata received from the one or more media streaming servers, wherein the second specific personalized audio presentation is made up of one or more second audio program elements in the plurality of audio program elements of the personalized audio program in the media presentation;
sending, to the one or more media streaming servers, one or more second subsequent media streaming requests for the one or more second audio program elements;
receiving, from the one or more second media streaming servers, the one or more second audio program elements that make up the second specific personalized audio presentation.

24. The method of claim 21, wherein an audio program element in the one or more audio program elements is encoded into multiple sets of media segments, wherein the multiple sets of media segments respectively correspond to multiple representations of the same audio program in multiple bitrates, and wherein each set of media segments in the multiple sets of media segments is encoded for being transmitted at a respective bitrate in the multiple bitrates; further comprising:
streaming one or more first media segments in a first set of media segments, in the multiple sets of media segments, encoded for being transmitted at a first bitrate, wherein the one or more first media segments in the first set of media segments cover one or more first time durations of a period represented in the media presentation;
collecting runtime measurement data in connection with one or more of network conditions, network resources, network bandwidths, decoding complexity, perceptual qualities, network throughput variations, decoding complexity variations, or transmission errors, or network latencies;
based on the runtime measurement data, determining whether a different set of media segments in the multiple sets of media segments should be streamed instead of the first set of media segments;
in response to determining that a different set of media segments should be streamed instead of the first set of media segments, performing:
identifying a second different set of media segments, in the multiple sets of media segments, encoded for being transmitted at a second different bitrate;
streaming one or more second media segments in the second set of media segments, wherein the one or more second media segments in the second set of media segments cover one or more second time durations, of the period represented in the media presentation, immediately following the one or more first time durations.

* * * * *